US009723060B2

(12) United States Patent
Almadi et al.

(10) Patent No.: US 9,723,060 B2
(45) Date of Patent: Aug. 1, 2017

(54) INTEGRATED NODES, COMPUTER READABLE MEDIA AND PROGRAM PRODUCTS, AND COMPUTER-IMPLEMENTED METHODS FOR PROVIDING AN INTEGRATED NODE FOR DATA ACQUISITION, VERIFICATION AND CONDITIONING, AND FOR REMOTE SUBSYSTEM CONTROL

(71) Applicant: Saudi Arabian Oil Company, Dhahran (SA)

(72) Inventors: Soloman M. Almadi, Dhahran (SA); Soliman A. Al-Walaie, Dammam (SA); Tofig A. Al-Dhubaib, Kohbar (SA)

(73) Assignee: Saudi Arabian Oil Company, Dhahran (SA)

( * ) Notice: Subject to any disclaimer, the term of this patent is extended or adjusted under 35 U.S.C. 154(b) by 529 days.

(21) Appl. No.: 14/143,624

(22) Filed: Dec. 30, 2013

(65) Prior Publication Data
US 2014/0114598 A1 Apr. 24, 2014

Related U.S. Application Data

(62) Division of application No. 13/188,899, filed on Jul. 22, 2011, now Pat. No. 8,667,091.

(51) Int. Cl.
*G06F 15/16* (2006.01)
*H04L 29/08* (2006.01)
(Continued)

(52) U.S. Cl.
CPC .......... *H04L 67/10* (2013.01); *G06F 11/3476* (2013.01); *H04L 41/069* (2013.01);
(Continued)

(58) Field of Classification Search
None
See application file for complete search history.

(56) References Cited

U.S. PATENT DOCUMENTS 5,559,963 A * 9/1996 Gregg ................... H04J 3/0629
709/234
6,021,356 A 2/2000 Chang
(Continued)

FOREIGN PATENT DOCUMENTS

JP H06282314 A 10/1994
JP 2008516553 A 5/2008

OTHER PUBLICATIONS

Shankar et al. "Data Reconciliation &Gross Error Detection" An Intelligent use of process data Publication date 2000.*
(Continued)

*Primary Examiner* — Younes Naji
(74) *Attorney, Agent, or Firm* — Bracewell LLP; Constance G. Rhebergen; Christopher L. Drymalla

(57) ABSTRACT

Integrated nodes, such as programmable logic controllers, computer program products, computer readable media, and computer implemented methods are provided to allow a remote host to interface with a plurality of remote subsystems to thereby define an integrated node, and to provide for data acquisition, verification, and conditioning. An exemplary programmable logic controller includes a data acquirer configured to periodically acquire time-stamped data from each of the plurality of remote time-synchronized subsystems and archive the time-stamped data using the database server module, a data verifier configured to detect out-of-bounds measurements in the time-stamped data and to substitute the out-of-bounds measurements with new measurements, and a data reconciler configured to determine an operating state of the plurality of remote time-synchronized
(Continued)

subsystems and to reconcile the plurality of verified measurements.

21 Claims, 18 Drawing Sheets

(51) Int. Cl.
    *H04L 29/06*     (2006.01)
    *G06F 11/34*     (2006.01)
    *H04L 12/24*     (2006.01)

(52) U.S. Cl.
    CPC .............. *H04L 67/12* (2013.01); *H04L 69/08* (2013.01); *H04L 69/28* (2013.01); *G05B 2219/34413* (2013.01); *H04L 41/0686* (2013.01); *Y04S 40/166* (2013.01)

(56) References Cited

U.S. PATENT DOCUMENTS

| | | | |
|---|---|---|---|
| 6,721,607 B2 | 4/2004 | Brault | |
| 6,819,960 B1 | 11/2004 | McKelvey | |
| 6,950,851 B2 | 9/2005 | Osburn | |
| 7,120,558 B2 | 10/2006 | McIntyre | |
| 7,558,703 B2 | 7/2009 | Stoupis | |
| 7,565,351 B1 | 7/2009 | Callaghan | |
| 7,672,268 B2 | 3/2010 | Stanwood | |
| 7,953,092 B2 | 5/2011 | Pepper | |
| 7,979,221 B2 | 7/2011 | Gilbert | |
| 8,286,207 B1 | 10/2012 | Schneidewend | |
| 2003/0174070 A1 | 9/2003 | Garrod | |
| 2005/0255828 A1 | 11/2005 | Fisher | |
| 2006/0069689 A1 | 3/2006 | Karklins | |
| 2006/0240818 A1 | 10/2006 | McCoy | |
| 2007/0101178 A1 | 5/2007 | Jammu | |
| 2007/0206644 A1 | 9/2007 | Bertsch | |
| 2008/0071899 A1* | 3/2008 | Odaka | H04L 41/06 709/223 |
| 2008/0154393 A1 | 6/2008 | Reshef | |
| 2008/0183415 A1* | 7/2008 | Dykstra | E21B 41/00 702/113 |
| 2009/0073985 A1 | 3/2009 | Rogers | |
| 2009/0182846 A1 | 7/2009 | Bowler | |
| 2009/0216573 A1 | 8/2009 | Heiberg-Andersen | |
| 2010/0058052 A1 | 3/2010 | Bartels | |
| 2010/0101214 A1* | 4/2010 | Herman | F01N 3/208 60/277 |
| 2010/0141423 A1* | 6/2010 | Lin | G08B 25/10 340/539.1 |
| 2012/0084400 A1 | 4/2012 | Almadi | |
| 2012/0095574 A1* | 4/2012 | Greenlee | G05B 23/0245 700/30 |

OTHER PUBLICATIONS

Related U.S. Appl. No. 13/188,899, filed Jul. 22, 2011.
PCT Partial International Search Report for co-pending application No. PCT/US2011/045016, dated Dec. 14, 2011.

* cited by examiner

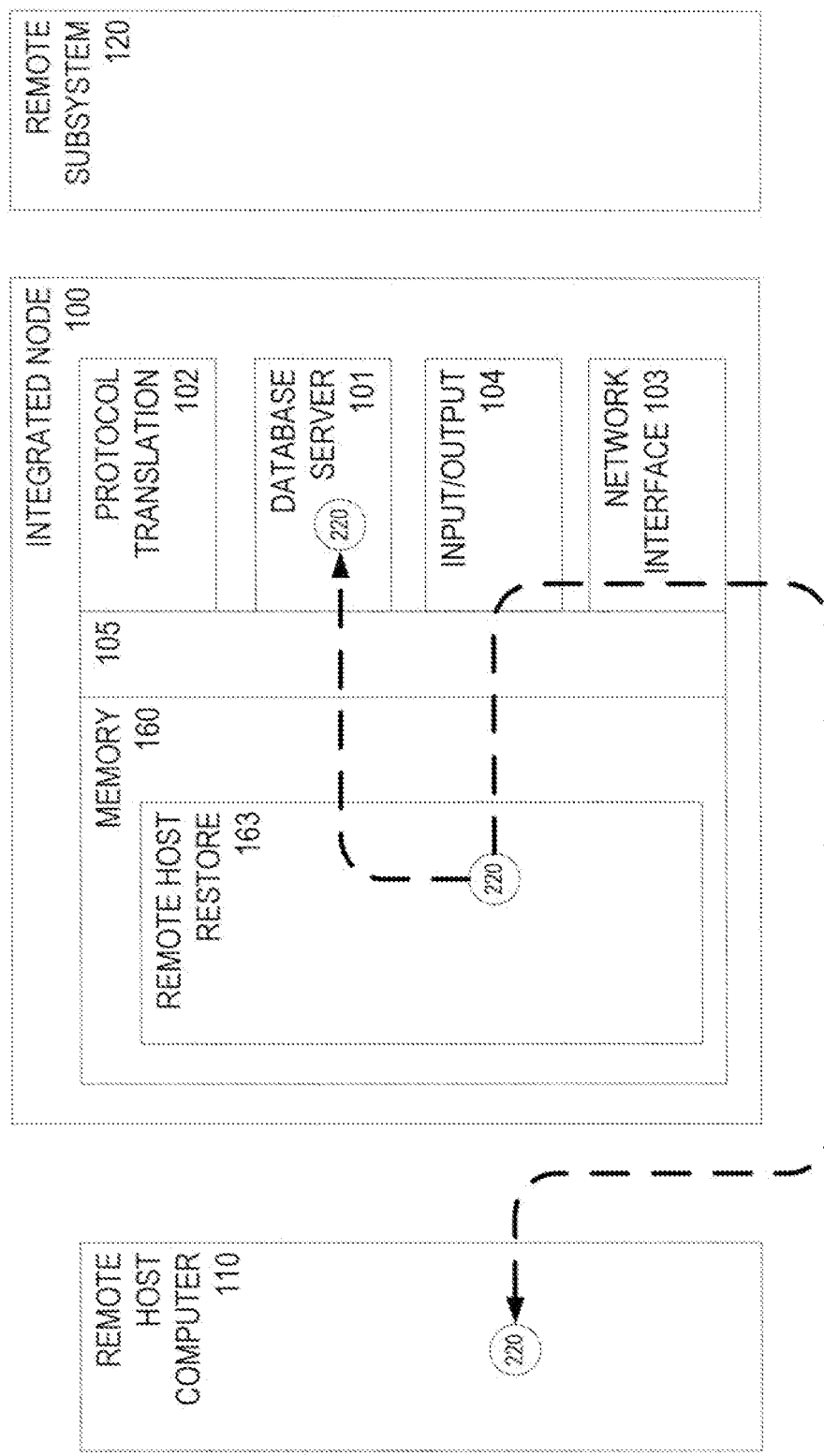

```
┌─────────────────────────────────────────────────────────────────────┐
│ MEMORY 160                                                           │
│ ┌─────────────────────────────────────────────────────────────────┐ │
│ │ EXECUTABLE COMPUTER PROGRAM 900                                  │ │
│ │                                                                   │ │
│ │      ┌────────────────────────────────────────────────────┐      │ │
│ │      │ DETECT A TIME OF COMMUNICATION FAILURE AND A       │─901  │ │
│ │      │ COMMUNICATION RECOVERY IN A COMMUNICATION LINK     │      │ │
│ │      │ BETWEEN THE INTEGRATED NODE AND ANY OF THE         │      │ │
│ │      │ PLURALITY OF REMOTE TIME-SYNCHRONIZED SUBSYSTEMS   │      │ │
│ │      └────────────────────────────────────────────────────┘      │ │
│ │                             │                                     │ │
│ │             ┌───────────────┴──────────────────┐                  │ │
│ │             │ REPORT TIME OF COMMUNICATION     │─902              │ │
│ │             │ FAILURE AND TIME OF              │                  │ │
│ │             │ COMMUNICATION TO THE REMOTE HOST │                  │ │
│ │             └──────────────────────────────────┘                  │ │
│ │             ┌──────────────────────────────────┐                  │ │
│ │             │ RECEIVE COMMAND FROM REMOTE HOST │─903              │ │
│ │             │ TO INITIATE RESTORATION          │                  │ │
│ │             └──────────────────────────────────┘                  │ │
│ │                             │                                     │ │
│ │      ┌──────────────────────┴─────────────────────────────┐      │ │
│ │      │ RETRIEVE ONE OR MORE DATA FILES FROM ONE OF THE    │─904  │ │
│ │      │ PLURALITY OF REMOTE TIME-SYNCHRONIZED SUBSYSTEMS   │      │ │
│ │      │ RESPONSIVE TO THE DETECTED TIME OF COMMUNICATION   │      │ │
│ │      │ FAILURE AND TIME OF DETECTED COMMUNICATION RECOVERY│      │ │
│ │      └────────────────────────────────────────────────────┘      │ │
│ │                             │                                     │ │
│ │  ┌────┐   ┌────────────────────────────────────────────────┐     │ │
│ │  │ TO │──▶│ EXTRACT TIME-STAMPED PROCESS DATA FROM THE ONE │─905 │ │
│ │  │1701│   │ OR MORE DATA FILES FROM THE TIME OF THE        │     │ │
│ │  └────┘   │ COMMUNICATION FAILURE TO THE TIME OF THE       │     │ │
│ │           │ CORRESPONDING COMMUNICATION RECOVERY           │     │ │
│ │           └────────────────────────────────────────────────┘     │ │
│ │                 │                              │                  │ │
│ │ ┌───────────────▼──────────┐   ┌───────────────▼──────────┐      │ │
│ │ │ TRANSMIT TIME-STAMPED    │   │ DETECT THAT TIME-STAMPED │─811  │ │
│ │806│ PROCESS DATA TO THE    │   │ PROCESS DATA SATISFIES   │      │ │
│ │ │ REMOTE HOST              │   │ PRE-DEFINED EXCEPTION    │      │ │
│ │ └──────────────────────────┘   │ CRITERIA                 │      │ │
│ │              │                 └──────────────────────────┘      │ │
│ │ ┌────────────▼─────────────┐   ┌──────────────────────────┐      │ │
│ │ │ DETECT BANDWIDTH         │   │ REPORT EXCEPTION ALARM   │─812  │ │
│ │807│ STARVATION IN          │   │ TO THE REMOTE HOST       │      │ │
│ │ │ COMMUNICATION LINK       │   └──────────────────────────┘      │ │
│ │ │ BETWEEN THE INTEGRATED   │              │                      │ │
│ │ │ NODE AND THE REMOTE HOST │              │                      │ │
│ │ └──────────────────────────┘              │                      │ │
│ │              │                            │                      │ │
│ │ ┌────────────▼─────────────┐   ┌──────────▼───────────────┐      │ │
│ │ │ BUFFER DATA TRANSMISSIONS│   │ RECEIVE/HANDLE COMMANDS  │─813  │ │
│ │808│ IN THE COMMUNICATION   │   │ FROM REMOTE HOST         │      │ │
│ │ │ LINK BETWEEN THE         │   │ RESPONSIVE TO EXCEPTION  │      │ │
│ │ │ INTEGRATED NODE AND THE  │   │ ALARM                    │      │ │
│ │ │ REMOTE HOST              │   └──────────────────────────┘      │ │
│ │ └──────────────────────────┘                                     │ │
│ └─────────────────────────────────────────────────────────────────┘ │
└─────────────────────────────────────────────────────────────────────┘
```

*FIG. 9*

INTEGRATED NODES, COMPUTER READABLE MEDIA AND PROGRAM PRODUCTS, AND COMPUTER-IMPLEMENTED METHODS FOR PROVIDING AN INTEGRATED NODE FOR DATA ACQUISITION, VERIFICATION AND CONDITIONING, AND FOR REMOTE SUBSYSTEM CONTROL

RELATED APPLICATIONS

This application is a divisional of and claims priority and the benefit of U.S. application Ser. No. 13/188,899, which claims priority and the benefit of U.S. Provisional Patent Application No. 61/367,207 filed Jul. 23, 2010 titled "Machine, Computer Program Products, And Computer-Implemented Methods Providing An Integrated Node For Data Acquisition And Control," and is related to U.S. application Ser. No. 14/143,585, filed on Dec. 30, 2013, titled "Integrated Nodes, Computer Readable Media and Program Products, and Computer-Implemented Methods for Providing an Integrated Node For Data Acquisition and Recovery, and for Remote Subsystem Control," each incorporated herein by reference in its entirety.

BACKGROUND OF THE INVENTION

Field of the Invention

The present invention relates generally to automated industrial processes. In more particular aspects, the present invention relates to the control of, and acquisition of data from, remote and in-plant subsystems in automated industrial processes.

Description of the Related Art

The automation architecture of modern industrial operations, such as that found in modern oil and gas field applications, is enabled at the field-level and process-level by various interconnected devices herein referred to as remote subsystems or field devices. These field devices monitor and collect data, such as measurements of fluid pressure, temperature, or flow, reflective of the operations of the automated process. These field devices are connected to machines known as controllers that operate at the system-level to process the data collected and issue commands back to the field devices, or to other field devices, in response to processing the collected data. The repeated process of receiving collected data and issuing commands thereby constitutes control over the operation of the automated process. For example, field devices perform sensor functions to sense operational information and variables such as temperature, pressure, pH, or flow rate and deliver that information to the system-level controller devices. In addition, field devices can perform actuator functions to receive information, such as commands, from the system level to thereby affect or control the operation of an automated process, for example, through motors and pumps. Accordingly, the sensor and actuator functions, at the process level, are supported by a controller or a number of controllers, at the system level, which receive information from the sensors and transmit information to the actuators. Field devices may be termed "intelligent field devices," generally, in the sense that they may also incorporate more robust functionality, such as the ability to process data, self-monitor, self-regulate, self-calibrate, or provide early warning with respect to malfunctions or predictive maintenance.

The deployment of intelligent field devices requires a complex system architecture, for example, including the setup and calibration of multiple hardware components, such as system-level controller devices including one or more programmable logic controllers ("PLC" or "PLCs") and remote terminal units ("RTU" or "RTUs"). The system level devices require other systems for the retention of data received from the field devices, such as a database server. Also, field devices and controller devices are frequently interconnected using network technology, requiring network devices such as an Ethernet switch, which can also connect the automation network to remote host computers, such as a Supervisory Control and Data Acquisition (SCADA) host.

Applicants recognize numerous problems, as well as the sources of these problems, in conventional automation remote subsystems. For example, setup and calibration of such a system is made increasingly complex as more and more types of field devices are added to the automation environment, some requiring the use and support of different communication protocols among a variety of existing communication protocols currently in use in the industry. Accordingly, the architecture and configuration of conventional automation systems, especially those using intelligent field devices, can present several logistical problems. First, a greater number of hardware components are needed, which places demands on the limited resources, such as electric power and physical floor space, of an enterprise. Moreover, the number of different hardware components that may be necessary tends to increase the complexity of the support model for the system, for example, for deployment, maintenance, and operation of a multi-device and multi-protocol architecture. Therefore, to employ a plurality of remote field systems, one must employ numerous hardware components typically including, for example: (a) a plurality of controller units, such as PLCs and RTUs, to issue commands to, and gather and process data from a plurality of field devices, including remote subsystems and instruments, and according to any one of multiple communication protocols; (b) a database server for the storage of process data retrieved from the remote subsystems and instruments; and (c) a communication infrastructure supporting multiple communication interfaces, including network connectivity and multi-protocol support. As various subsystems implement different communication protocols and interfaces, even more intermediary devices may be required. In addition to the cost and other disadvantages of having to supply the number of hardware components described, the operation of numerous hardware components results in increased power and space requirements and a more complex support model to deploy, maintain, and operate the components.

SUMMARY OF THE INVENTION

Applicants recognize that the operation of numerous hardware components disadvantageously results in multiple points of control, thereby creating an undesirable risk of conflicts in data collection and an undesirably low tolerance for network and host failure. For example, one common disadvantage in employing multiple systems as described above occurs when the data collected and stored is not time-stamped according to a uniform, synchronized time, rendering the data incompatible for purposes of interfacing with time-based functions provided by or for a host computer, which can cause data collection conflicts between captured data and host data, such as in systematic analysis performed at the remote host, for example, for process simulation and optimization, e.g., reservoir modeling and characterization. Furthermore, existing systems employing multiple devices that are not synchronized as to time cannot sufficiently tolerate network and host failure without encountering an undesirable loss of the collected data during the outage period, which cannot be regenerated during the outage, for example, in a capacity overload condition.

Various embodiments of the present invention provide an integrated node used to interface between a remote host server and the plurality of remote subsystems in a process automation environment to provide, in turn, for a single point of control for data collection, monitoring, and restoration responsive to timestamps being synchronized to a single timing source, thereby enabling a more uniform basis for collection and restoration of data. Accordingly, various embodiments of the present invention provide machines, computer-readable media having computer programs or computer program product stored thereon, and computer-implemented methods to provide an integrated node for data acquisition from process automation remote subsystems.

Exemplary embodiments of an integrated node, for example, integrate the functions of controller units, communications networking devices, and data storage servers into one unit. Various embodiments of an integrated node can also, for example, employ an Ethernet switch to support networking over multiple communication interfaces and transmit process data to a remote host sever over TCP/IP (transmission control protocol and the internet protocol, also referred to as the internet protocol suite), thereby beneficially reducing the number of hardware components needed and allowing a simpler support model. Further, various embodiments of an integrated node, for example, can employ an OPC server (also known as "OLE for Process Control"), or any suitable server or drivers known to those having skill in the art, to support multiple communication protocols. Even further, various embodiments of an integrated node can comprise a PLC or RTU, or employ the functionality of a PLC or RTU, for example through hardware or software, to issue commands and collect and process data according to multiple process automation protocols without the need for multiple PLC or RTU components, thereby further reducing the number of hardware components needed and allowing a simpler support model.

Furthermore, various embodiments of an integrated node beneficially reduce the potential for data collection conflicts by providing time synchronization among the subsystems and the remote server and beneficially providing network monitoring and failure recovery by restoring data transmissions in the event of a communications failure, including any type of network failure or systems failure, between the integrated node and the plurality of remote subsystems or between the integrated node and the remote server. Accordingly, various embodiments of an integrated node simplify the support model, including deployment, maintenance, and operation, of a process automation system by combining multiple systems into one system that provides multi-system functionality by incorporating the functionality of a PLC, RTU, and Ethernet switch and supporting multiple interfaces, multiple protocols, and field-system data retention through the addition of local data storage capacity.

Still further, the use of an integrated system, e.g., an embodiment of an integrated node, provides for a central point of control to enforce time synchronization for the data and among the host, subsystems, and upper application layers. For example, various embodiments of an integrated node advantageously combine a TCP/IP Ethernet Switch, PLC or RTU logic, input/output interfaces supporting multiple communication protocols and enabled with data storage capability, FTP client/server support, and OPC interface capabilities. Various embodiments of an integrated node, for example, advantageously store data having time-synchronization capability with the remote host server, thereby allowing the automation system to better tolerate failure or interruption of communications with the host or in the network, to minimize collection conflicts between captured data and host data used for simulation and optimization, and minimize risk that a network failure or a host failure will result in loss of the collected data during the outage period, essentially regenerating data not transmitted during an outage or overload condition. Yet further, various embodiments of an integrated node allow for reduced power requirements by minimizing the number of hardware components, and the associated power and floor space requirements, in the field and by simplifying the support model in supporting any of multiple protocols and interface types.

An exemplary embodiment, for example, provides a programmable logic controller having a central processing unit and a memory to allow a remote host to interface with a plurality of remote subsystems to thereby define an integrated node. Although an embodiment of an integrated node is described as being a programmable logic controller, the integrated node can also be any computer known to those having skill in the art, having suitable functionality, including, for example, a computer with programmable logic controller functionality, a remote terminal unit, or a computer with remote terminal unit functionality. The integrated node can be constructed to withstand indoor and outdoor conditions, with an operating environment in a range of about 10 to 35 degrees Celsius, indoor, and about −20 to 70 degrees Celsius, outdoor.

Various embodiments, for example, can further include a network interface for routing network connections to and with a remote host and a plurality of remote subsystems. Various embodiments of an integrated node also include a protocol translator or translation server or suitable drivers to convert or to translate communications with each of a plurality of remote subsystems according to any of a number of messaging protocols known to those having skill in the art. Also, various embodiments of an integrated node can include an input/output unit positioned to transfer communications between and among the node and the remote subsystems and the remote host. Various embodiments of an integrated node further can include a database or a database server positioned to archive data acquired from the subsystems in time-stamped archive files, each time-stamped archive file corresponding to a respective remote subsystem.

According to a specific embodiment, provided is an exemplary programmable logic controller (PLC) having a central processing unit and a non-transitory computer-readable storage medium and configured to allow a remote host to interface with a plurality of remote subsystems to thereby define an integrated node, and to provide for data acquisition, verification, and conditioning. The programmable logic controller includes an input-output unit or units configured to transfer communications between the programmable logic controller, a plurality of time-synchronized remote subsystems, and a remote host, a database server configured to archive data acquired from the plurality of time-synchronized subsystems in a plurality of time-stamped archive files, a data acquirer configured to periodically acquire time-stamped data from each of the plurality of remote time-synchronized subsystems and archive the time-stamped data using the database server module, and a data verifier configured to detect measurement values outside of an upper bound, a lower bound, or both the upper and the lower bounds defining out-of-bounds measurements in measurements of the time-stamped data and to substitute the out-of-bounds measurements with new measurements responsive to a filtering scheme to thereby define a plurality of verified measurements. The programmable logic controller can also include a data reconciler configured to determine an operating state of the plurality of remote time-synchronized subsystems and to reconcile the plurality of verified measurements responsive to the operating state of the plurality of remote time-synchronized subsystems.

The data verifier can be in the form of a computer program stored on the non-transitory computer-readable storage medium, comprising a set of instructions that, when executed by the central processing unit, causes the programmable logic controller to perform the operations of determining that a first measurement in the time-stamped data acquired from the plurality of remote time-synchronized subsystems is out-of-bounds to define an out-of-bounds measurement, and substituting the out-of-bounds measurement with a second measurement so that the time-stamped data including the substituted second measurement. The second measurement can be one of a minimal or maximal value of a preselected interval of past measurements, a last good measurement, an average of the upper bound and the lower bound, an average of a preselected number of measurements or of an interval of past measurements, an upper bound, a lower bound, or a preselected value.

The data reconciler can be in the form of a computer program stored on the non-transitory computer-readable storage medium, the computer program comprising a set of instructions that, when executed by the central processing unit, causes the programmable logic controller to perform the operations of determining an operating state of one or more process units of a plurality of the remote time-synchronized subsystems, the determining operation being responsive to the plurality of verified measurements from the plurality of remote-time synchronized subsystems, determining a reconciliation model responsive to the plurality of verified measurements, the reconciliation model corresponding to one or more process units and the operating state for the one or more process units, and reconciling the plurality of verified measurements responsive to the reconciliation model, the reconciliation operation being a sequential quadratic programming algorithm, to thereby define a plurality of reconciled measurements.

According to another specific embodiment, provided is a method to allow a remote host to interface with a plurality of remote subsystems via an integrated node and to provide for data acquisition, verification, and conditioning. The method can include the steps of transferring communications between the integrated node, a plurality of time-synchronized remote subsystems, and a remote host, acquiring time-stamped data from each of the plurality of remote time-synchronized subsystems, archiving data acquired from the plurality of time-synchronized subsystems in a plurality of time-stamped archive files, detecting measurement values outside of an upper bound, a lower bound, or both the upper and the lower bounds defining out-of-bounds measurements in measurements of the time-stamped data, and substituting the out-of-bounds measurements with new measurements responsive to a filtering scheme to thereby define a plurality of verified measurements.

The steps of detecting out-of-bounds measurements and substituting the out-of-bounds measurements with new measurements can collectively include determining that a first measurement in the time-stamped data acquired from the plurality of remote time-synchronized subsystems is out-of-bounds to define an out-of-bounds measurement, and substituting the out-of-bounds measurement with a second measurement so that the time-stamped data including the substituted second measurement. The second measurement can be one of the following: one of a minimal or maximal value of a preselected interval of past measurements, a last good measurement, an average of the upper bound and the lower bound, an average of a preselected number of measurements or of an interval of past measurements, an upper bound, a lower bound, or a preselected value.

The method can also include discarding the out-of-bounds measurement responsive to the substitution of the out-of-bounds measurement with the second measurement, and storing, returning, or both storing and returning the verified measurements to a data reconciler. The method can further or alternatively include determining an operating state of the plurality of remote time-synchronized subsystems, and reconciling the plurality of verified measurements responsive to the operating state of the plurality of remote time-synchronized subsystems.

According to another specific embodiment, provided is a non-transitory computer-readable storage medium or media embodying one or more computer programs to allow a remote host to interface with a plurality of remote subsystems and to provide for data acquisition, verification, and conditioning, the one or more computer programs collectively comprising a set of instructions, that when executed by a central processing unit (e.g., one or more processors) of an integrated node, cause the integrated node to perform the steps described above in those as described in more detail below.

Various embodiments can even further include computer programs or computer program products for managing data transmissions between the node and the subsystems and between the node and the remote host. As one skilled in the art will appreciate, the present invention is not limited to embodiments using a single computer program or computer program product. For example, one skilled in the art will appreciate that the present invention or particular functions or operations embodying the present invention could be also be embodied in multiple computer programs or multiple computer program products, separate computer programs or separate computer program products, combined hardware products and multiple computer programs or multiple computer program products, or a single computer program or single computer program product having the functionality of one or more computer programs or computer program products described herein. Various embodiments of a computer program or a computer program product can be stored in or on a non-transitory computer-readable storage medium, such as a memory, and operable on a processor, the memory being a tangible and non-transitory computer-readable storage medium. Various embodiments of a computer program comprise a set of instructions to be executed on the processor.

The set of instructions in the computer program or computer program product, as can be shown with reference to FIG. 8 for example, can include an instruction to synchronize 801 an internal clock in the remote host and an internal clock in each of the remote subsystems, thereby resulting in the remote host and the remote subsystems being time-synchronized with the remote host according to a uniform time. The set of instructions can also include an instruction to synchronize an internal clock in other hardware or software components of the integrated node, as will be understood by those having skill in the art. Time synchronization can be performed continuously or on demand, based on preset synchronization criteria. Further, various embodiments can include an instruction to acquire 802 time-stamped process data at a pre-defined rate from each of the subsystems, which are time-synchronized. The integrated node, for example, can acquire time-stamped process data at a preselected rate of once every second. The time-stamp can indicate, for example, the date and time at which the process data was generated. The time-stamp can be applied, for example, by either of the remote subsystem or the integrated node, provided that each of the remote subsystem and the integrated node are synchronized according to a uniform time. As one having skill in the art will appreciate, the time-stamp can indicate the time at which the process data was generated or, perhaps, any other time that is relevant to the process data.

Various embodiments of the present invention can further provide instructions to, upon receiving the time-stamped process data from a remote subsystem, determine whether the time-stamped process data constitutes an exception responsive to preselected exception criteria. As one skilled in the art will appreciate, the instructions for determining exception criteria can be executed either at the integrated node, at the remote subsystem, or at the remote host. When the computer program product having instructions is executed at the remote subsystem, the remote subsystem communicates an alarm to the integrated node to be received by the integrated node. A step of determining that the acquired time-stamped process data satisfies pre-defined exception criteria can be performed by the integrated node, whereby the integrated node then reports an exception alarm to the remote host so that the remote host receives the alarm, for example, for processing at the remote host. For example, the remote host can then execute instructions responsive to the alarm, for example, to relay or present the alarm to a human user or to cause the remote host to issue a command to the integrated node in response to the alarm, which the integrated node may later receive and process to thereby affect the operation of the integrated node or any of the remote subsystems using the PLC or RTU functionality. Once the integrated node acquires the time-stamped process data, the computer program product in the integrated node can archive 803 the time-stamped process data in a time-stamped archive file pursuant to such an instruction. The time-stamped archive file can be time-stamped responsive to the date and time, for example, the date and time at which the process data was generated for each respective time-synchronized subsystem. In certain embodiments, data contained within the archive file does not require scaling, but one skilled in the art will appreciate that scaling may be implemented as necessary. The archive file can be time stamped by name, for example, having a name fitting the format YYYY-MM-DD.CSV, where YYYY is the numeric year, MM is the numeric month, and DD is the numeric day. Furthermore, archive files can be stored in a time stamped directory, also time stamped by name, for example, having a name with the first three letters of the month followed by the last two digits of the year YY, i.e., MMMYY (e.g., "SEP07").

Various embodiments of a computer program product stored in an integrated node can also contain computer program product having instructions to receive and handle 804 a command from the remote host at a second pre-defined rate to transmit certain time-stamped process data from the integrated node to the remote host, and in response thereto, the computer program product can include instructions to extract 805 from at least one time-stamped archive file the certain time-stamped process data responsive to the command. Also, the computer program product, when executed, can transmit 805 to the remote host the time-stamped process data responsive to extracting the time-stamped process data from the archive file.

Various embodiments of the present invention can also provide an intergraded node including a computer program or computer program product to monitor and recover transmissions between the integrated node and a plurality of remote subsystems. As one skilled in the art will appreciate, the invention is not limited to embodiments using a single computer program or computer program product. For example, one skilled in the art will appreciate that the present invention or particular functions or operations embodying the present invention could be also be embodied in multiple computer programs or multiple computer program products, separate computer programs or separate computer program products, combined hardware products and multiple computer programs or multiple computer program products, or a single computer program or single computer program product having the functionality of one or more computer programs or computer program products described herein. Various embodiments of a computer program or a computer program product can be stored in or on a non-transitory computer-readable storage medium, such as a memory, and operable on a processor, the memory being a tangible and non-transitory computer-readable storage medium. Various embodiments of a computer program product comprise a set of instructions to be executed on the processor.

The set of instructions in the computer program or computer program product, for example, can include an instruction to detect a communication failure between the integrated node and any of the plurality of remote subsystems, including detecting the time of the communication failure. Also, various embodiments of a computer program product instruct the integrated node to detect a corresponding communications recovery between the integrated node and the subsystem for which a communications failure was detected, including detecting the time of the communications recovery. After detecting both the communications failure and the communications recovery, the computer program product can further include instructions that, when executed by the processor, instruct the integrated node to retrieve a data file or a plurality of data files from the remote subsystem for which a communications failure and communications recovery was detected. The computer program product can further include instructions that, when executed by the processor, instruct the integrated node to extract time-stamped process data from the data file or files retrieved, responsive to retrieving the data file or data files. The time-stamped process data can be extracted starting from the time of the communications failure and ending at the time of the communications recovery. The computer program product can further include instructions that, when executed by the processor, instruct the integrated node to transmit the extracted process data to the remote host responsive to extracting the process data.

Various embodiments of an intergraded node can also include a third computer program or computer program product for monitoring and recovery of transmissions between the integrated node and the remote host. As one skilled in the art will appreciate, the present invention is not limited to embodiments using a single computer program or computer program product. For example, one skilled in the art will appreciate that the present invention or particular functions or operations embodying the present invention could be also be embodied in multiple computer programs or multiple computer program products, separate computer programs or separate computer program products, combined hardware products and multiple computer programs or multiple computer program products, or a single computer program or single computer program product having the functionality of one or more computer programs or computer program products described herein. Various embodiments of a computer program or a computer program product can be stored in or on a non-transitory computer-readable storage medium, such as a memory, and operable on a processor, the memory being a tangible and non-transitory computer-readable storage medium. Various embodiments of a computer program comprise a set of instructions to be executed on the processor.

The set of instructions in the computer program or computer program product, for example, can include an instruction to detect a communication failure between the integrated node and the remote host, including detecting the time of the communication failure. Also, various embodiments of a computer program product can further include instructions that, when executed by the processor, instruct the integrated node to monitor for and to detect a corresponding communications recovery between the integrated node and the remote host, including detecting the time of the communication recovery. Various embodiments of a computer program product can further include instructions that, when executed by the processor, instruct the integrated node to report the time of the communication failure and the time of the communication recovery to the remote host, responsive to detecting both the communications failure and the communications recovery, so that the remote host can initiate a restoration of missing data. The computer program product can further include instructions that, when executed by the processor, instruct the integrated node to extract time-stamped process data from a time-stamped archive file responsive to the time of the communications failure and the communications recovery, and then, to transmit the extracted time-stamped process data to the remote host so that the remote host can receive the time-stamped process data. Various embodiments of a computer program product can further include instructions that, when executed by the processor, instruct the integrated node to monitor the communications link between the integrated node and the remote host to detect 806 bandwidth starvation in the data transmissions, and to buffer 808 the data transmissions responsive thereto.

In another exemplary embodiment of the present invention, a programmable logic controller having a central processing unit and a memory can allow a remote host to interface with a plurality of remote subsystems, to thereby define an integrated node. Although various embodiments of an integrated node are described as being a programmable logic controller, the embodiments of an integrated node can also be any computer known to those having skill in the art, having suitable functionality, including, for example, a computer with programmable logic controller functionality, a remote terminal unit, or a computer with remote terminal unit functionality. Various embodiments of an integrated node can be constructed to withstand indoor and outdoor conditions, with an operating environment in a range of approximately 10 to 35 degrees Celsius, indoor, and in a range of approximately −20 to 70 degrees Celsius, outdoor. Various embodiments of an integrated node can further include an input/output unit positioned to transfer communications between the integrated node and any of the plurality of remote subsystems or the remote host. The integrated node can also include a database server positioned to archive data acquired from the plurality of remote subsystems in one or more time-stamped archive files, for example, with each of the one or more time-stamped archive files corresponding to a respective subsystem.

Various embodiments of the present invention can further provide an integrated node having a time-synchronizer to synchronize an internal clock in the remote host and in each of the remote subsystems, thereby resulting in the remote host and remote subsystems being time-synchronized with the remote host, according to a uniform time. Time synchronization can be performed, as will be understood by those having skill in the art, continuously or on-demand based on preset synchronization criteria. The integrated node can also include a data acquirer positioned to periodically acquire time-stamped data from each of a plurality of remote time-synchronized subsystems. The data acquirer can further be positioned to archive the time-stamped data using the database server.

The integrated node can also include an exception reporter positioned to determine exceptions in the acquired time-stamped data, and upon determining an exception, to report the exceptions to the remote host. The integrated node can further include a data uploader that is positioned to periodically upload archived time-stamped data to the remote host. Various embodiments of an integrated node can further include a subsystems restorer positioned to detect a communications failure between retrieved time-stamped data from any of the plurality of remote subsystems, for example, upon detecting a communications failure and a communications recovery between the integrated node and any of the remote subsystems. Various embodiments of an integrated node can even further include a host restorer positioned to restore data transmissions to the remote host responsive to a communications failure between the integrated node and the remote host.

Another exemplary embodiment of the invention includes computer-implemented methods providing a uniform recovery of interrupted data transmissions between a plurality of remote subsystems and an integrated node being is positioned to allow a remote host to communicate with a plurality of remote subsystems. Various embodiments of methods include, for example, detecting a time of a communications failure and a time of a corresponding communications recovery in a communications link between the integrated node and any of the remote subsystems, provided that each of the integrated node and the remote subsystems are time-synchronized according to a substantially uniform time source. The method further includes retrieving at least one data file containing time-stamped process data from any of the plurality of subsystems responsive to the time of the communications failure and a corresponding communications recovery. Various embodiments of methods further include restoring time-stamped process data to the remote host computer responsive to the retrieving operation.

Another exemplary embodiment of the present invention provides a computer-implemented method for allowing a uniform recovery of interrupted data transmissions between a remote host and an integrated node, such as a PLC, that is positioned to acquire process data from a plurality of remote subsystems. The method includes detecting a time of a communications failure and a time of a corresponding communications recovery in a communications link between the integrated node and the remote host, provided that the integrated node and the remote host are time-synchronized according to a uniform time source. Various embodiments of methods include reporting the time of the communications failure and the time of the communications recovery to the remote host so that the remote host can initiate a restoration of missing data as a result of the communications failure.

In addition, various embodiments include other machines, systems, computers, computer programs, computer program products, and associated computer-implemented methods of providing an integrated node for data acquisition, including monitoring and restoring data transmissions in the event of a communication failure, as will be understood by those having skill in the art.

Various embodiments of the present invention also include a data verifier to substitute out-of-bounds measurements in the time-stamped data with new measurements responsive to a preconfigured filtering scheme and to suspend data acquisition upon detecting an out-of-bounds measurement, to thereby define a plurality of verified measurements. Such embodiments also include a data reconciler to determine an operating state of the plurality of remote time-synchronized subsystems and to reconcile the plurality of verified measurements responsive to the operating state of the plurality of remote time-synchronized subsystems. Various embodiments of a data verifier can include, for example, a computer program product stored in memory that, when executed by the central processing unit, cause the integrated node to determine that a first measurement in the time-stamped data acquired from the plurality of remote time-synchronized subsystems is out-of-bounds responsive to a predefined upper bound and a predefined lower bound. The data verifier can also cause the integrated node to substitute a second measurement for the out-of-bounds first measurement, the second measurement being one of a minimal value or a maximal value of a preselected interval of past measurements, a last good measurement, an average of the upper bound and the lower bound, an average of a preselected number of measurements or of an interval of past measurements, the upper bound, the lower bound, or any preselected value. Further, the time-stamped data can include the substituted second measurement to define a plurality of verified measurements. The data verifier can also cause the integrated node to command the data acquirer to suspend acquiring time-stamped data from any of the plurality of remote time-synchronized subsystems responsive to determining an out-of-bounds measurement in the time-stamped data.

Various embodiments including a data reconciler can further include, for example, a computer program or a computer program product stored in a memory that, when executed by the central processing unit, causes the integrated node to determine an operating state of one or more process units of a plurality of remote time-synchronized subsystems, the determining operation being responsive to a plurality of verified measurements from one or more of the plurality of remote-time synchronized subsystems. The data reconciler including such computer program or computer program product, upon execution of the computer program or computer program product, can also cause the programmable logic controller to determine a reconciliation model responsive to the plurality of verified measurements, the reconciliation model corresponding to one or more process units and the operating state for the one or more process units. The data reconciler can also cause the integrated node to reconcile the plurality of verified measurements responsive to the reconciliation model, the reconciliation operation being a sequential quadratic programming algorithm, to thereby define a plurality of reconciled measurements. The data reconciler can also cause the programmable logic controller to detect a change in the operating state of one or more process units responsive to a later plurality of verified measurements. The data reconciler can also cause the programmable logic controller to determine a new reconciliation model for the one or more process units responsive to the change in the operating state detected so that the reconciliation operation can proceed responsive to the new reconciliation model.

BRIEF DESCRIPTION OF THE DRAWINGS

So that the manner in which the features and benefits of the invention, as well as others that will become apparent, may be understood in more detail, a more particular description of the invention briefly summarized above may be had by reference to the embodiments thereof, which are illustrated in the appended drawings, which form a part of this specification. It is also to be noted, however, that the drawings illustrate only various embodiments of the invention and are therefore not to be considered limiting of the invention's scope as it may include other effective embodiments as well:

FIG. 2C is a schematic flow diagram of an integrated node restoring data at the remote host computer in response to a communication failure and recovery between the remote host computer and the integrated node, including extracting process data from the archive file at the integrated node and transmitting the data to the remote host computer according to an embodiment of the present invention.

FIGS. 8-11 are schematic flowcharts illustrating one or more exemplary computer programs or computer program products according to embodiments of the present invention.

DETAILED DESCRIPTION OF THE INVENTION

Figure 1A:
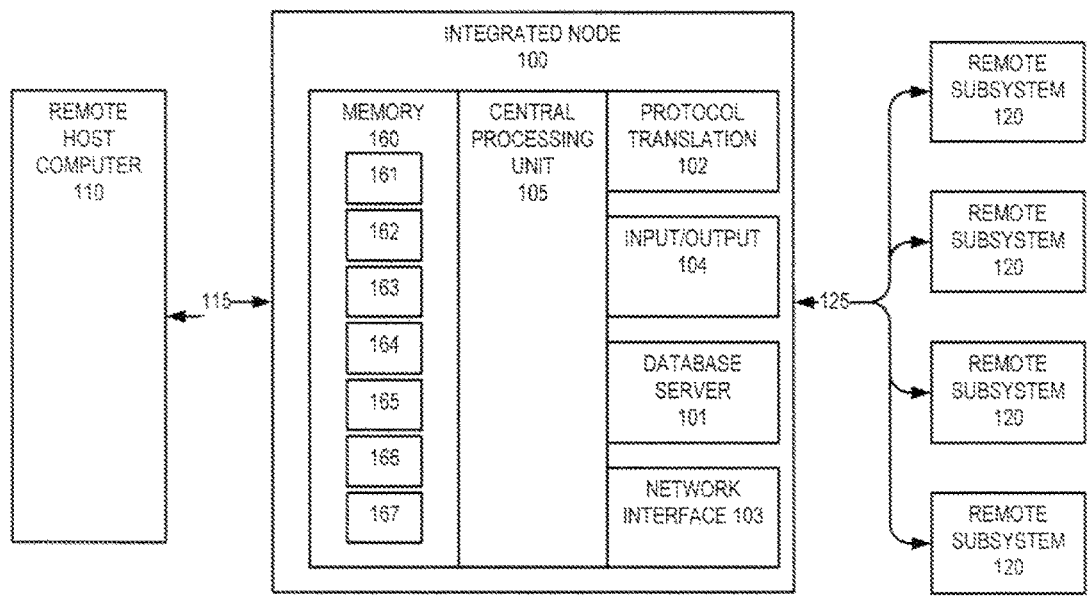
FIG. 1A is a schematic block diagram of an integrated node interfacing with a remote host computer and a plurality of remote subsystems according to an embodiment of the present invention.
Figure 1B:
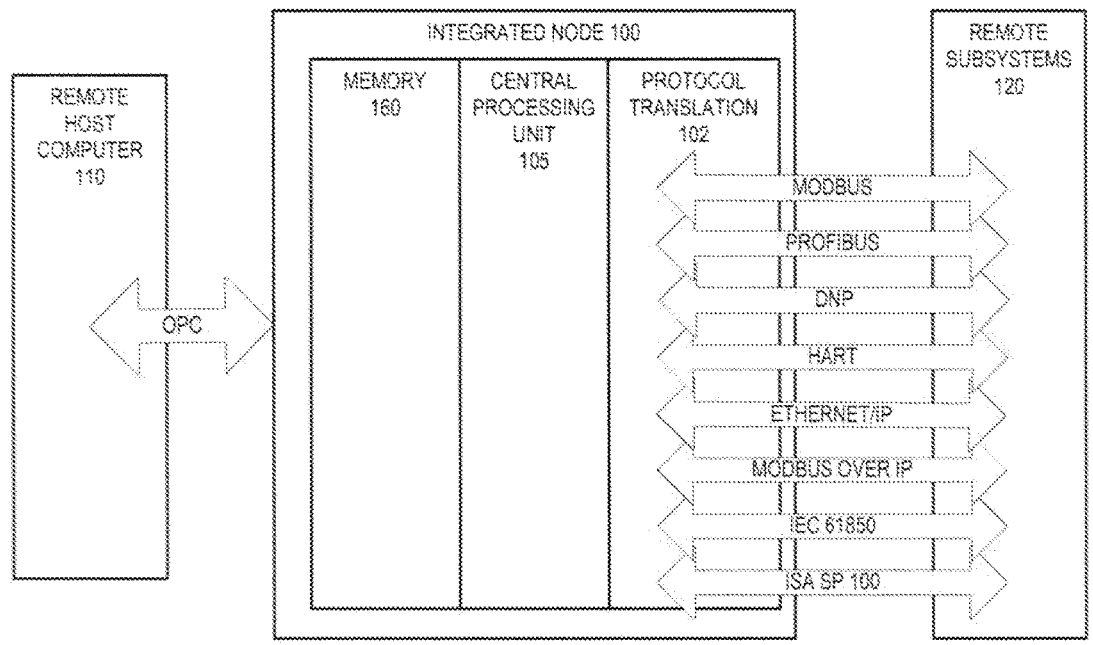
FIG. 1B is a schematic block diagram of an integrated node interfacing with a remote host computer and a plurality of remote subsystems having various different communication protocols according to an embodiment of the present invention.

An embodiment of an integrated node 100 can be shown, as illustrated in FIGS. 1A-1B, having a central processing unit 105 and a memory 160 to allow a remote host 110 to interface with a plurality of remote subsystems 120. Integrated node 100 is a programmable logic controller (PLC), meaning any programmable logic controller (PLC), remote terminal unit (RTU), PLC with RTU functionality, RTU with PLC functionality, or any type of computer, terminal, server, system, node, or unit or other machine as understood by those having skill in the art that can incorporate PLC or RTU functionality or both. The integrated node can be constructed to withstand indoor and outdoor conditions, with an operating environment in a range of about 10 to 35 degrees Celsius, indoor, and about −20 to 70 degrees Celsius, outdoor. The integrated node 100 is connected to any of the remote host computer 110 or remote subsystems 120 by way of communication links 115 and 125, respectively, as will be understood by those having skill in the art. The integrated node 100 includes a protocol translator or translation server 102, which may also be protocol translation drivers operable on the central processing unit 105, as will be understood by those having skill in the art, network interface 103, input/output unit 104 and database server 101, which are operable on the central processing unit 105. The central processing unit (CPU) 105 can have an architecture selected such that at peak load conditions the CPU utilization does not exceed 50%. A memory 160, being a non-transitory computer-readable storage medium, is provided and can be sized such that 50% of total memory supplied is available after all memory requirements for system and application software are utilized at peak load conditions. The CPU 105 and memory 160 can be selected to adequately support switchover between a primary and a redundant host server without adverse effect on programs, control application, tasks running on the node, and field data stability. The PLC or RTU functions of the integrated node 100 enable data processing in the integrated node 100 and also enable data collection from, and control of, the plurality of remote subsystems 120. PLC and RTU functionality includes PLC-like and RTU-like configurations that combine features of PC-based control systems with that of a typical PLC or RTU, such as a programmable automation controller (PAC) or distributed RTU, including, for example "smart" RTU or PLC technology implemented with IEC 61131-3 (Ladder Logic), as will be understood by those having skill in the art, to enable autonomous execution of simple logic processes without involving a master computer, including the following operations: arithmetic functions: add, subtract, multiply, divide, square root, binary-coded-decimal (BCD) to integer, integer to BCD; logic functions: and, or, exclusive or, not, flip/flops; math instructions for arithmetic and logic functions to convert analog input to real (floating point) numbers; shift register functions: bit shift left, bit shift right; comparison functions: less than, greater than, less than or equal, greater than or equal, equal, not equal; timer/counter functions: count-up, count-down, time up, time down (with accumulator, preset and time-base sub-elements) time base 0.01 seconds and 1.0 seconds; relay contact elements, and transition; and relay coil elements: standard, latch, and unlatch, as will be understood by those having skill in the art.

The integrated node 100 also supports a local programming interface over a computer, such as through computer terminal having one or more input devices and one or more display devices that are accessible to a human user (not pictured) or, for example, by using the remote host computer 110. The integrated node 100 can further support proportional-integral-derivative control (PID), closed loop control, open loop control, and logic and sequence functions. Furthermore, the integrated node 100 can support report-by-exception and report-all for status data. Where process application calculations or compensation algorithms are required, for example, in power, gas, or liquid flow operations, the integrated node 100 can perform required calculations independent of any external computer. The integrated node 100 can support, for example, 100 milliseconds (msec) time resolution (e.g., after filtering and buffering of signals) for discrete inputs for sequence-of-events functions.

Various embodiments including a plurality of remote subsystems 120 can include, for example, intelligent field systems such as permanent down hole monitoring ("PDHM") systems, electrical submersible pump ("ESP") systems, smart well completion ("SWC") systems, and flow meter systems, and any of the types of Intelligent Equipment Devices ("IED") that can be used, for example, in electrical substation automation, utilities, and transportation sectors, as will be understood by those having skill in the art. Remote subsystems 120 can perform tasks including processing of measurement and control data and signal conversions. Remove subsystems 120 can also adapted to be programmed so as to communicate with other field devices, for example, independent of the integrated node. For example, intelligent sensors, actuators and controllers can be connected to a network by means of communication busses, interface boards, cables, and accessories. Such devices can be configured, for example, using various configuration and control applications being known to those having skill in the art. With respect to system operations, those having skill in the art will appreciate the need to optimize adaptation of data and system topology, the integration of the systems, and grouping of field instruments. As one skilled in the art will further appreciate, the present invention is not limited to the use of remote automation subsystems in any particular industry, sector, or operating environment, and can serve different networking operating environments, including, for example, intelligent field systems for oil and gas, electrical substations/power grid systems, and remote security systems, and enterprise systems. The remote host 110 can be any type of remote host computer for management or hosting of process automation functions as will be known or available to those having skill in the art, for example, a SCADA host.

As can be shown with reference to FIGS. 1A-1B, the integrated node 100 includes a network interface 103 for routing network connections with a remote host and a number of subsystems. The local network interface 103 can be, for example, a network switch including a network bridge for processing and routing functions at the data link layer (Layer 2) of the Open System Interconnection ("OSI") Reference Model or any known Layer 3 switch or router or any known multi-layer switch for processing and routing data at the data link or network layers, as will be understood by those having skill in the art, and including, for example, general functional capabilities according to the following IEEE (Institute of Electrical and Electronics Engineers) standards: 802.1D spanning tree protocol, 802.1P QoS tagging and port-based priority, 802.1Q frame tagging and VLAN trunking, 802.1w rapid spanning tree, 802.1x port-based network access control, 802.3 Ethernet group, 802.3u fast Ethernet, 802.3z gigabit Ethernet (fiber-based), 802.3ab gigabit Ethernet (copper-based; unshielded twisted pair category 5e, or 6 cabling), 802.3ad link aggregation, 802.3x full duplex flow control. In addition to rapid spanning tree, for example, the local network interface can support the use of proprietary protocols within a fiber optic ring with the fastest convergence time possible in the event of device failure or fiber optic cable cuts. Furthermore, an embodiment of an integrated node 100 can provide a network solution based on ring topology enchantments that are able to increase ring reliability, reduce bandwidth requirements, and decrease network delay. Various embodiments of the present invention can serve different networking operating environments, including, for example, intelligent field for oil and gas, substations/power grid, and remote security, and can utilize and can be extended for enterprise applications.

In addition, network communication links 125 may include, for example, any of 100BaseTX, EIA/TIA Category 5, 6, or 7 UTP two-pair wiring, one user per segment up to 100 meters long, using an RJ-45 connector with a physical star topology and a logical bus; 1000Base-T, Category 5, four-pair UTP wiring up to 100 meters long; 1000Base-SX, multi-mode fiber using 62.5 and 50-micron core, using 850 nanometer laser for up to 220 meters with 62.5-micron, up to 550 meters with 50-micron; 1000BaseLX, single-mode fiber that uses a 9-micron core and 1310 nanometer laser and can go from 3 kilometers up to 10 kilometers; or 1000BaseLH/ZX, which operates on ordinary single-mode fiber optic link and spans up to 43.4 miles long. The network interface can also implement the following specifications for physical construction: IEC60068-2-6, mechanical Stability for Vibration; IEC60068-2-27 and IEC 60068-2-29, mechanical stability for shock; EN 61000-6-2 and -4, electromagnetic characteristics for interference immunity; IGMPv1/RFC1112; IGMPv2/RFC 2236; SNMPv3/RFC 3410; MIB II/RFC 1158; RMON/RFC 1757; IP20 (IEC 536) ingress protection; IP67, ingress protection.

Figure 2A:
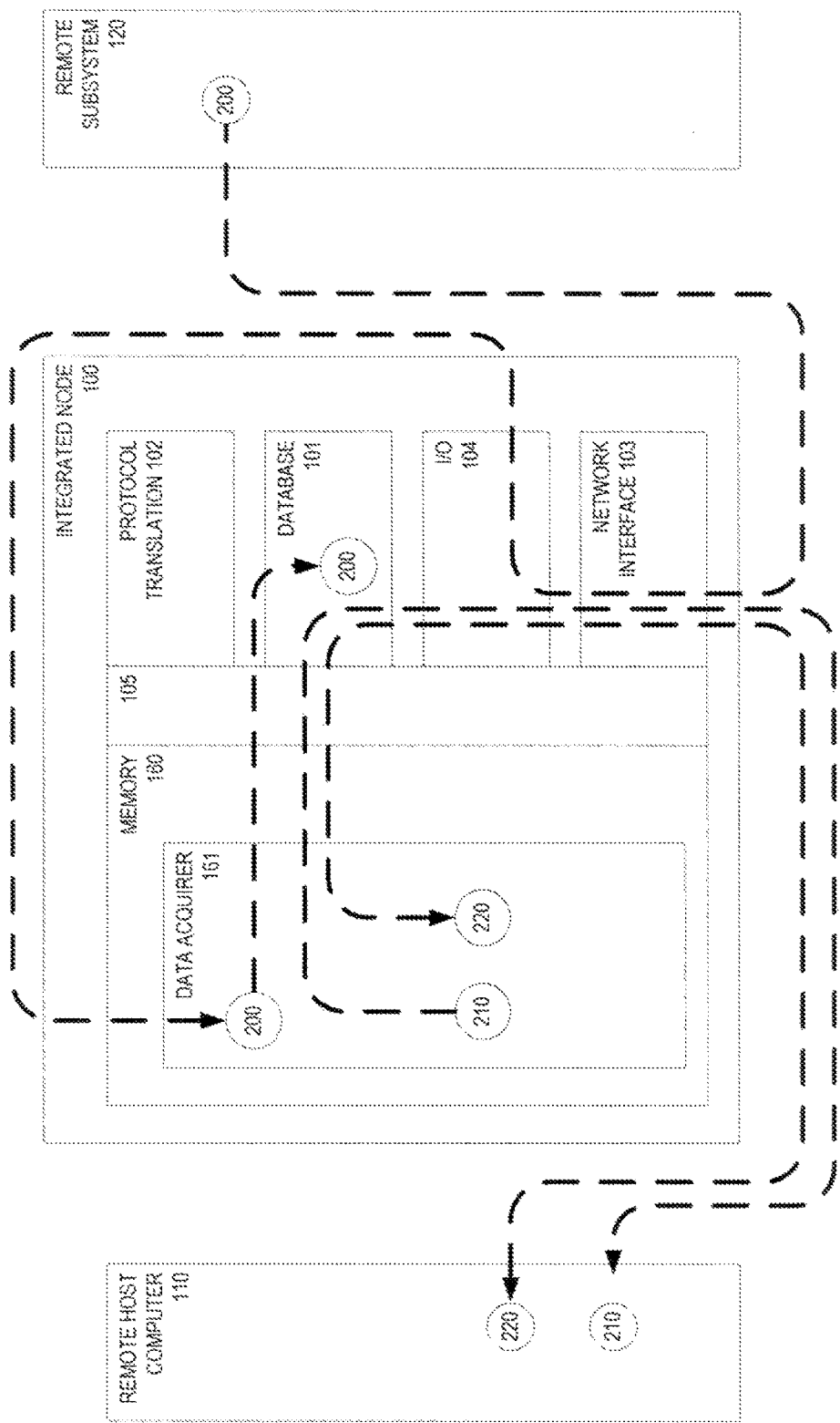
FIG. 2A is a schematic flow diagram of an integrated node acquiring process data from the remote subsystem, reporting exceptions to the remote host computer, and transmitting data to the remote host computer according to an embodiment of the present invention.

An exemplary embodiment of an integrated node 100, as can be shown in FIG. 1A and FIG. 2A, for example, includes an input/output unit 104 positioned to transfer communications between the integrated node 100 the plurality of remote subsystems 120 and the remote host computer 110. The input/output unit 104 provides both serial and Ethernet interfaces over communication links 115 and 125, which can be any type of serial or Ethernet links, including 10/100/1000 Mb/s Ethernet speed that is operable to communicate on different communication media such as fiber optic, copper, VSAT, and or wireless. Various embodiments of the present invention also allow seamless communication through readily available wireless systems and services. For example, corporate Wi-Fi networks (IEEE 802.11a/b/g/n) in conjunction with cellular networks (GSM/TETRA) can be used to transport field data in a fully redundant and prioritized manner. Accordingly, connectivity (cost and quality) is optimized diversity in network connectivity can be achieved. The input/output unit 104 can support, for example, any of analog inputs, analog outputs, digital inputs, digital outputs, pulse inputs, and pulse outputs for both wired and wireless instrumentation interfaces (analog, digital and wireless ISA100.11a/WHART/Zigbee). For example, in addition to analog communications using the standard analog signal (4-20 milliamps (mA)) employed at the process level, digital networks can be used to communicate according to protocols standardized according to the Fieldbus Committee of the International Electrotechnical Commission (IEC TC65 SCC)/International Society for Measurement and Control (ISA), such as the Field Bus type 61158, as will be known by those having skill in the art.

As can be shown with reference with FIG. 1B, an exemplary embodiment of an integrated node 100 can further include a protocol translator or translation server 102 to translate communications with each of the remote subsystems 120 according to any one or more of a plurality of messaging protocols (as can be shown with reference to the arrows connecting protocol translator or translation server 102 and the plurality of remote subsystems 120). As will be understood by those having skill in the art, a protocol translator or translation server 102 can be configurable, such as being configured by a user, for example through a configuration tool interface, to support communications according to various protocols, including various protocols over serial and Ethernet physical interfaces, such as Serial Modbus, Modbus over IP (Internet Protocol), Highway Addressable Remote Transducer (HART) Protocol, Foundation Fieldbus, Distributed Network Protocol (DNP), IEC 61850, ISA100.11a, Wireless HART, ZigBee, and Ethernet/IP (Ethernet Industrial Protocol), including supporting subsystems data exchange. Furthermore, the integrated node 100 can configurable, such as being configured by a user, for example through a configuration tool interface, to support different connection types, protocol types, and speed rates.

Furthermore, in certain embodiments, the protocol translator or translation server 102 can be configured so that the node, the remote host, and each of the plurality of remote subsystems are time-synchronized based on a uniform timing source, as is described further herein with respect to the computer programs or computer program products. For example, the protocol translator or translation server 102 can facilitate transmitting and/or writing a time stamp (also referred to as a timing stamp) to a record at one or more of the plurality of remote subsystems utilizing telecontrol protocols supported by the communication protocol implemented at the remote subsystem (e.g., Modbus and DNP). The timestamp portion of the record, for example, can include six (6) consecutive registers (32-bit unsigned integers), as will be understood by those having skill in the art, containing data for year, month, day, hour, minute, and seconds. Time synchronization may also be achieved, for example, for end-to-end Ethernet based devices using NTP (Network Time Protocol), SNTP (Simple Network Time Protocol) based on Coordinated Universal Time (UTC), local/remote GPS units, or Precession Timing Protocol (PTP, IEEE 1588).

As illustrated in FIG. 1B, the protocol translator or translation server 102 also includes standards-based functionality for consistent access to field data at the remote subsystems according to any of the protocols utilized by the subsystems, including, for example, the functionality of an OPC (OLE for Process Control) driver or OPC server to define a common interface for data at the node and at the remote host computer. Accordingly, only one interface is required at the node and the remote host computer to exchange data with the remote subsystems, whereas the communication links with remote subsystems operate according to any of a plurality of supported communication protocols. As will be appreciated by those having skill in the art, OPC interfaces can facilitate intercommunications between different hardware and software, allowing communication even between devices that were not originally intended to be part of an industrial network or process automation environment.

Figure 3:
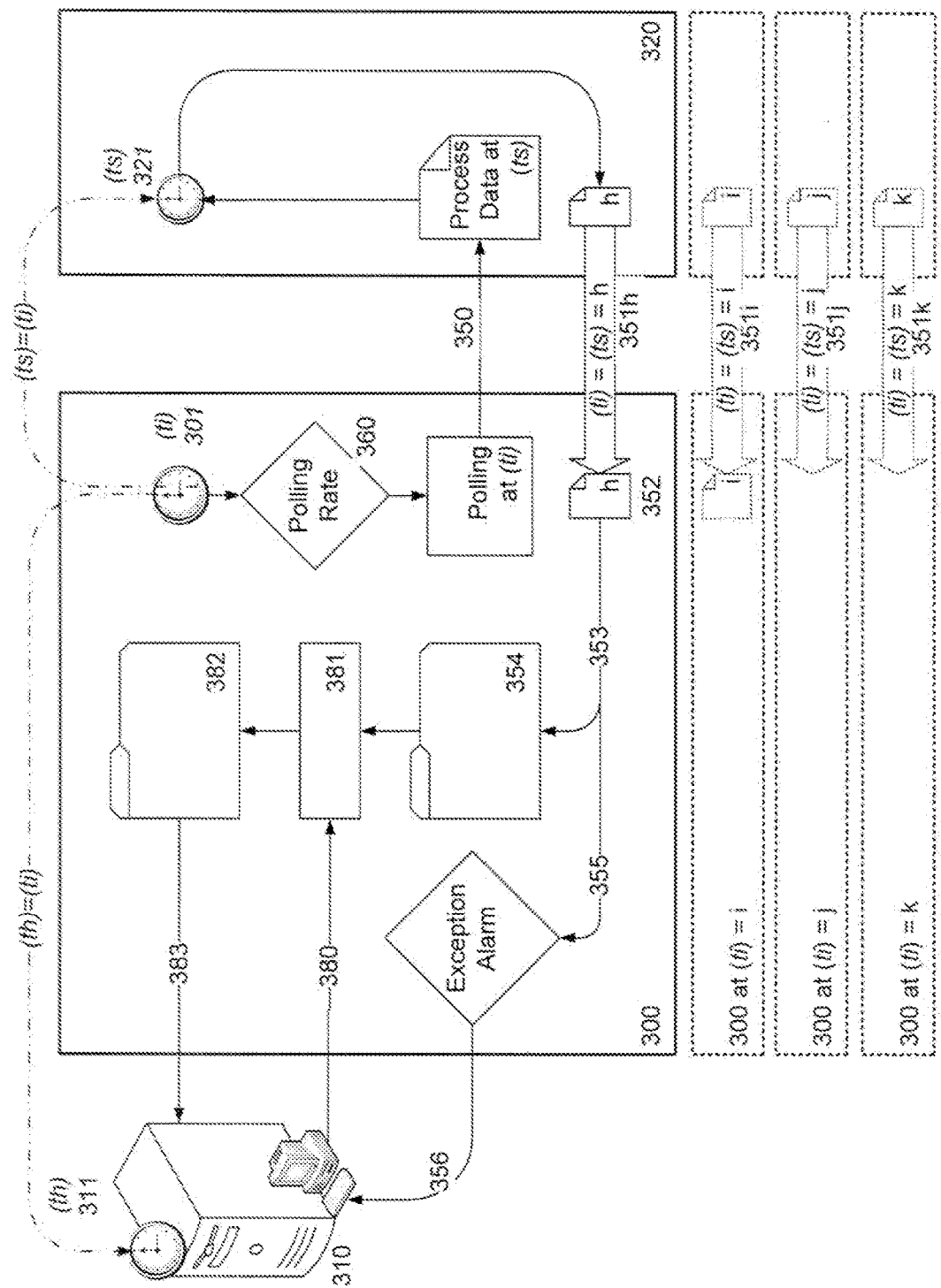
FIG. 3 is a schematic diagram of an integrated node showing the operation of data acquisition by the integrated node, including exception reporting to the remote host computer, and the operation of data retrieval from, and data transmission to, the remote host computer via the integrated node, according to an embodiment of the present invention.

Various embodiments of an intergraded node can further include computer programs or computer program products, such as the data acquirer 161, as can be shown with reference to FIG. 2A, for managing data transmissions between the node and the subsystems and the node and the remote host. As one skilled in the art will appreciate, the present invention is not limited to embodiments using a single computer program or computer program product. For example, one having skill in the art will appreciate that the present invention can be embodied in multiple computer program products, multiple computer program products and hardware products, or combined in a single computer program product having the functionality of other computer program products described further herein. The computer programs or computer program product are stored on a memory 160, the memory being a tangible, non-transitory computer-readable storage medium, and operable on a processor 105. Computer programs or computer program product have a set of instructions stored therein, that when executed by the processor 105, perform certain operations. The set of instructions in the computer program product 161, for example, can include an instruction to synchronize an internal clock 311, 321 in the remote host and in each of the remote subsystems, as depicted in FIG. 3, thereby causing the remote host and the remote subsystems to be time-synchronized with the clock 301 in the remote host, according to a uniform time. The instructions, when executed, can also synchronize an internal clock in other hardware or software components of the integrated node 100, as will be understood by those having skill in the art. Time synchronization can be performed continuously or on-demand, for example, based on preset synchronization criteria. As one skilled in the art will appreciate, time synchronization can be performed by a separate or stand-alone computer program product executed by a processor, for example, at the integrated node 100 or at the remote host computer 110. In certain embodiments, the internal node 100 acquires, from each of the remote subsystems 120, which have been time-synchronized, certain time-stamped process data, at a pre-defined rate. As can be shown with reference to the data flow path 200 in FIG. 2A, the data flow path includes, for example, the network interface 103, input output unit 104, and protocol translator or translation server 102. Once the integrated node 100 acquires the time stamped process data, instructions from the computer program product 161 at the integrated node, when executed at the processor, can archive the time-stamped process data in a time-stamped archive file in the database 101.

In further detail, as can be shown with reference to FIG. 3, which illustrates the operations performed by an embodiment including a data acquirer 161. Variables $(t_i)$, $(t_s)$, and $(t_h)$ are exemplary time references at the integrated node 300, a remote subsystem 120, and the remote host computer 310, respectively. Times $(t_i)$, $(t_s)$, and $(t_h)$ are synchronized so as to be uniform across each of the integrated node 300, remote host computer 310, and remote subsystem 320 at internal clocks 301, 311, and 321 therein, respectively. The integrated node 300 polls for sub-system or instrumentation data containing time and process variables (e.g., pressure, temperature, flow). The integrated node 300 acquires data, such as, for example, subsurface sensor and subsystem data, from the remote subsystem 320, at a pre-defined rate 360 by polling the remote subsystem 320 at a time $(t_i)$, shown where $(t_i)$=h, i, j, and k, the period between each of h, i, j, and k corresponds to the preselected rate 360. The integrated node 320 can acquire data at a rate of one (1) sample per second with an execution cycle time≤100 msec including input/output (I/O) scan and execution of any diagnostics and application programs. The data acquired 351h, 351i, 351j, 351k corresponds to polling at times $(t_i)$=h, i, j, and k and is time stamped respectively. The time-stamp can indicate the date and time at which the process data was generated. The time-stamp can be applied either by the remote subsystem or by the integrated node, given that each are synchronized according to a uniform time. Either of the remote subsystem 320 or the integrated node 300 can time-stamp the acquired data 351h, 351i, 351j, and 351k based on the uniform and synchronized clocks 321 and 301, respectively. As can be shown with reference to FIG. 3, the collected data 352 has been time-stamped by the remote subsystem 320. As is shown in the drawing, time stamping by marking a time "h" is illustrated for exemplary purposes only. Those having skill in the art will recognize any suitable method or convention of time stamping data transmissions, for example, in time-stamped data files or packets. Collected data readings can be based on IEEE 32 floating points, and the timestamp portion of the record, for example, can include 6 consecutive registers (32-bit unsigned integers) containing data for year, month, day, hour, minute, and seconds.

As can be shown with reference to the archiving step 353 as illustrated in FIG. 3, an archive file 354 can be populated with the time-stamped process data 352 responsive to the acquiring operation 351h. Although not illustrated for subsequent acquiring operations 351i, 351j, and 351k, those having skill in the art will appreciate that the same archiving process 354 can be followed as that illustrated for acquiring operation 351h. Archive file 354 corresponds to remote subsystem 320; and as will be understood by those having skill in the art, as there are a plurality of remote subsystems 320, there can be a corresponding plurality of archive files 354, or for example, a plurality of archive files 354 for each process category. Furthermore, any of the plurality of archive files 354 can be time stamped and, thus, correspond to date and time of the data archived therein. Any of the plurality of archive files 354 can be in a comma-separated values (CSV) format, as will be understood by those having skill in the art, and stored in the integrated node 300, continuously, based on the predefined polling rate 360. For data contained within the archive file 354, scaling is optional as will be understood by those having skill in the art. The archive file 354 can be time stamped by name, for example, having a name YYYY-MM-DD.CSV. Furthermore, archive files 354 can be stored in a time stamped directory, also time stamped by name, for example, having a name with the first three letters of the month followed by YY, i.e., MMMYY (e.g., Sep07). Archive file 354 can be stored in database 101, as can be shown with reference to FIG. 1A. Accordingly archive file 354 can be a daily archive file having stored therein acquired process data 352 and other acquired process data, such as data from acquisitions 351i, 351j, 351k, through 351n for any time n, representing the time of the last data acquisition of the day, and being updated responsive to the predefined polling rate 360. As one having skill in the art will appreciate, the present invention is not limited to this particular naming convention or daily archival window, and other naming conventions or archival windows are within the scope of the invention and this disclosure. Database or database server 101 is configured to allow copy access, including FTP functions, by the remote host 310—even while data therein is being continuously updated by archiving process 353. Those having skill in the art will appreciate various techniques to ensure no file access violations during the process of accessing the file, for example, by the remote host 300.

Figure 8:
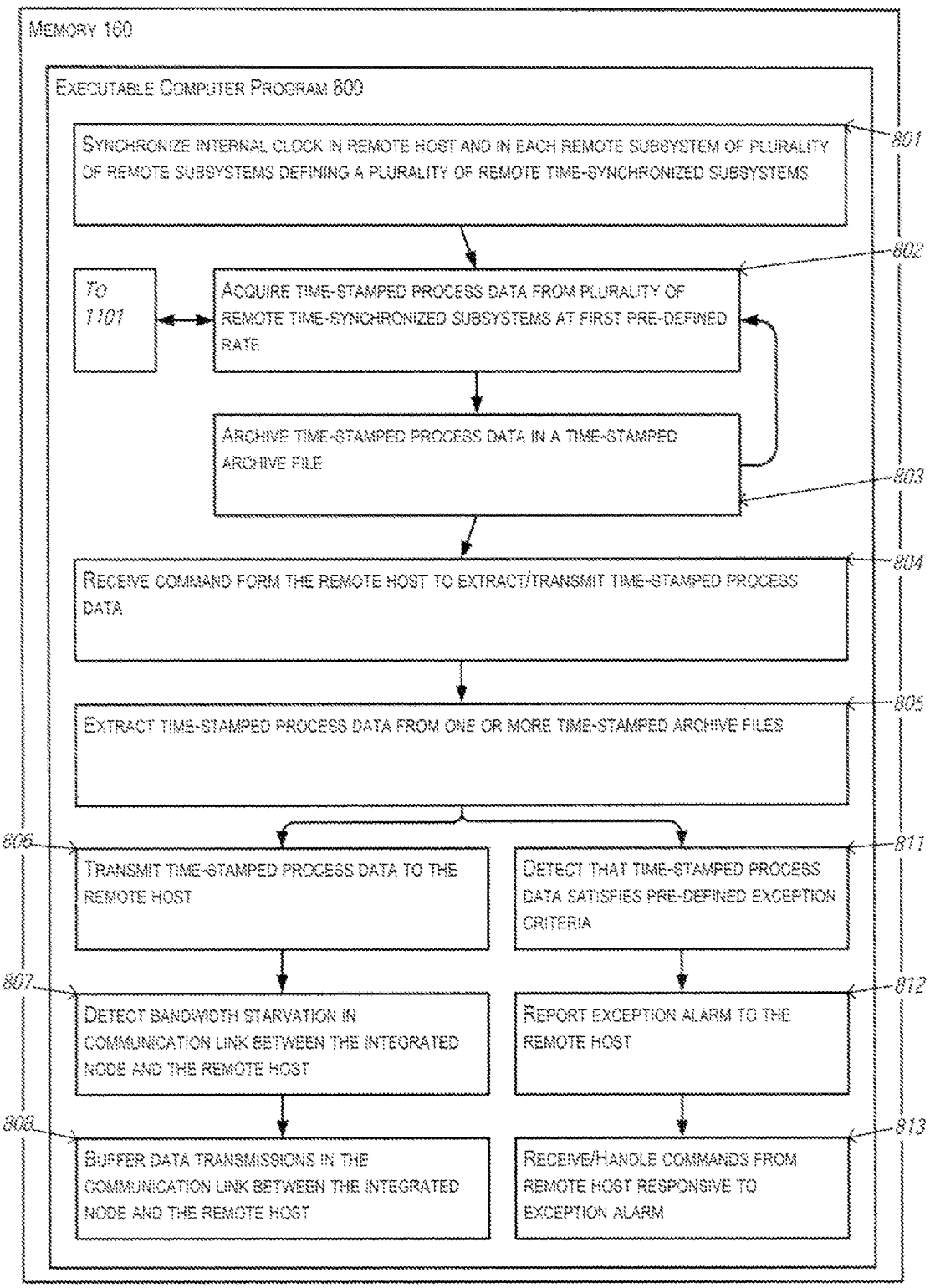
Figure 10:
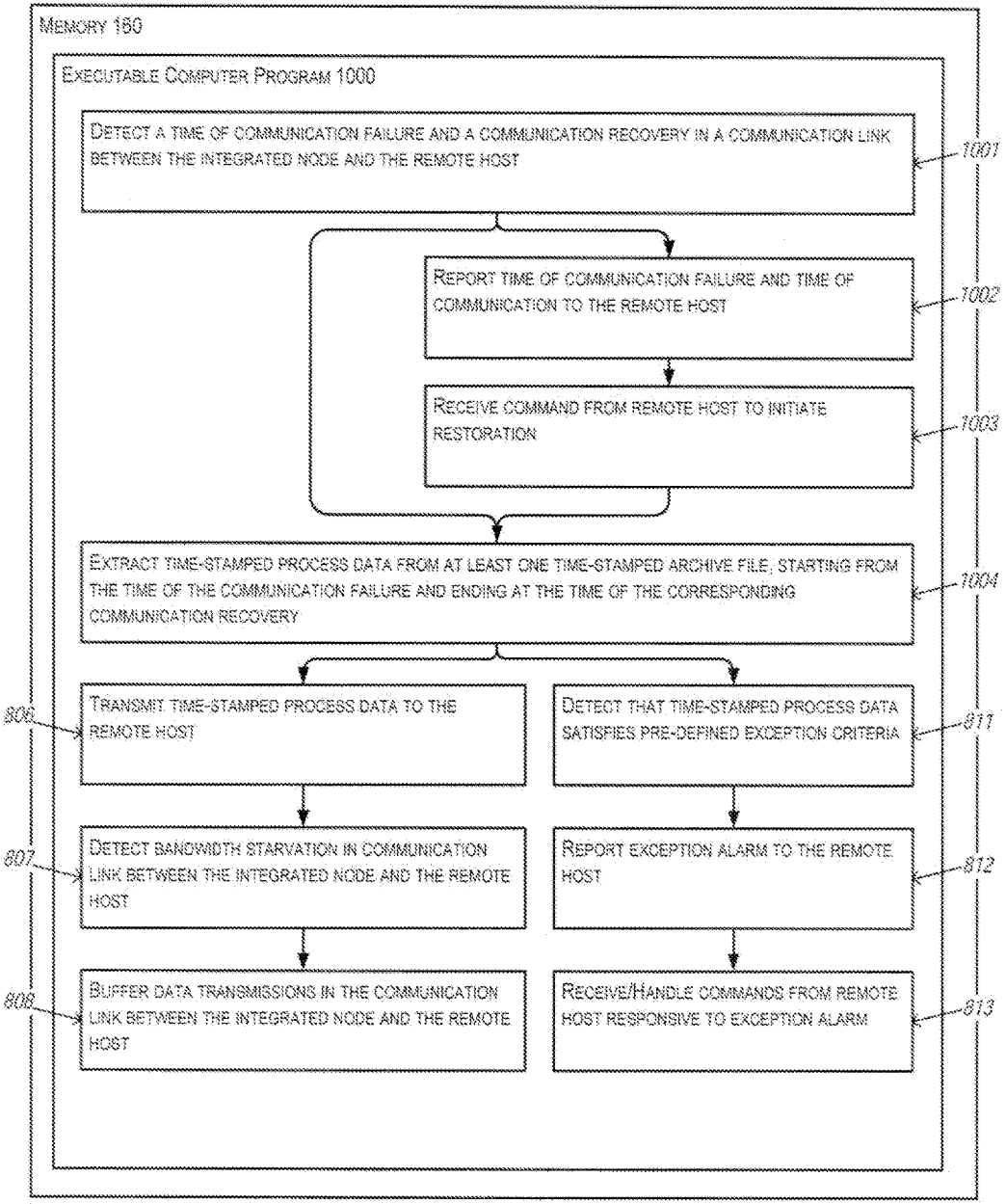

Upon receiving the time-stamped process data from a remote subsystem, the integrated node can determine whether the time-stamped process data constitutes an exception based on pre-defined exception criteria. A computer program product, which can be shown, for example, with reference to FIG. 8, FIG. 9, and FIG. 10, having instructions for such detection by comparing exception criteria 811 can be executed either at the integrated node, at the remote subsystem or at the remote host. When such a computer program product having such instructions is executed at the remote subsystem, the remote subsystem can further communicate or report 812 an alarm to the integrated node to be received by the integrated node according to further instruction in the computer program product. The step of determining that the acquired time-stamped process data satisfies pre-defined exception criteria can be performed at the integrated node, for example, as can be shown with reference to FIG. 2A, more particularly, data flow path 210. Data flow path 210 illustrates, for example, the integrated node 100 reporting an exception alarm to the remote host so that the remote host receives the alarm. Instructions for determining and reporting the exception alarm can be included in, for example, the data acquirer 161 or another computer program product or, perhaps, a hardware product operated by instructions from the data acquirer 161. As can be further shown with reference to data flow path 210, the reporting of an exception alarm includes data transmissions through input/output unit 104 and network interface 103 and in communication with remote host computer 110.

In further detail, as shown in FIG. 3, the integrated node 300 can be configured for reporting by exception. Responsive to the acquiring operation 351h, for example, the integrated node 300 can determine whether the time-stamped process data 352 satisfies pre-defined exception criteria, based on either percentage values or absolute values of process variable data. If an exception is determined 355, the integrated node 300 can immediately and responsively report the exception to the remote host computer. The determining operation 355, in the instructions included in the computer program product, can be made responsive to the acquiring operation, for example, 351h, and therefore the determining operation 355 can be performed continuously according to the same rate 360. Once the exception is reported 356 to the remote host computer 310, the remote host computer 310 can receive notice of the exception and can responsively issue a command to the integrated node 100, to be processed by the integrated node 100, having instructions for processing or handling the same 813, for example, using the PLC/RTU functions of the integrated node 300 to thereby control any of the plurality of remote subsystems 320.

An embodiment of computer program product 161 in the integrated node can also contain computer program product having instructions to receive a command from the remote host at a second pre-defined rate to transmit certain time-stamped process data from the integrated node to the remote host, and in response thereto, the computer program product includes in instructions to extract from at least one time-stamped archive file the certain time-stamped process data responsive to the command. Also, the computer program product includes instructions to transmit to the remote host the time-stamped process data responsive to extracting the time-stamped process data from the archive file. As can be shown with reference to data flow 220 in FIG. 2A, time-stamped process data can be retrieved from the archive file database 101 and transmitted using the input/output unit 104 and the network interface 103.

In further detail, as can be shown with reference to FIG. 3, the remote host computer 310 can issue a command 380 to the integrated node 310 to collect archived process variable data, e.g., 352, from the archive data file 354, at a pre-defined rate, which can be, for example, once (1) every sixty (60) seconds, regardless of any report-by-exception dead-band 356. The remote host computer 310 can issue a request, for example, using via file transfer protocol (FTP), to copy certain file or files from the integrated node 300 responsive to the current time ($t_h$) 311 at the remote host computer 310. The integrated node 300 can responsively serve the existing archived data file, for example, the archived data file 354, as requested. Further, the integrated node 300 can responsively extract certain archived process data 381 from the archived data file 354, in particular, responsive to the time of the request ($t_i$) 301 at the integrated node 300. Further, the integrated node 300 can responsively define a file 382 that is a subset of the archive file 354 containing data collected in the period corresponding to the period since the latest request 380. As will be understood by those having skill in the art, the integrated node 300 can, responsive to the request by the remote host computer 310, extract process data corresponding to any time parameter, from any archive file 354 of an existing plurality of archive files for multiple dates, subsystems, or other division to thereby extract data and define a file 382 to be transmitted 383 to the remote host computer 310. Further, as will be understood by those having skill in the art, the foregoing extraction, definition, and transmission can be initiated responsive to a predefined rate or on an ad-hoc basis. After data extraction, the integrated node 300 can transmit data to the remote host computer 310 through a variety of techniques known to those having skill in the art, including, for example, using standard history transfer. As is explained further herein, the process for reading data by the remote host 310 can allow data restoration by the remote host 310 in the event of a communication failure, for example, using the integrated 300 node as the FTP server. Those having skill in the art, however, will appreciate that the host computer 310 can also be configured as the server, and the integrated node 300 as the client. Configuration of client/server interactions can be performed, for example, either at the integrated node 300 or at the remote host 310.

Figure 2B:
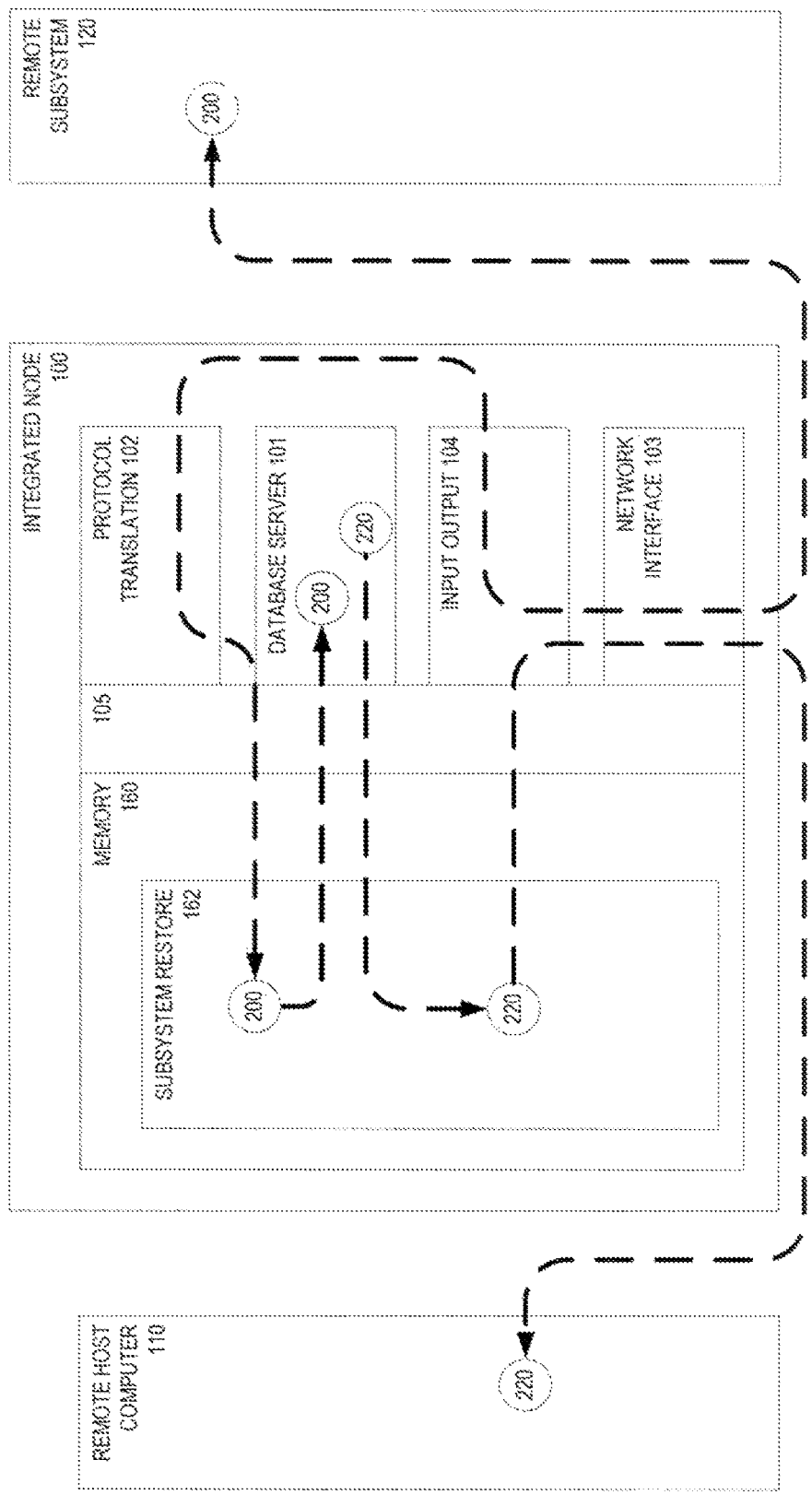
FIG. 2B is a schematic flow diagram of an integrated node restoring data at the remote host computer in response to detecting a communications failure and recovery, including retrieving data from the remote subsystem and transmitting data to the remote host computer, according to an embodiment of the present invention.

Various embodiments of an intergraded node can further include a computer program or a computer program product 162 to monitor and restore data transmissions between the integrated node 100 and the plurality of remote subsystems 120, as can be shown with reference to FIG. 2B. As one skilled in the art will appreciate, the present invention is not limited to embodiments using a single computer program or computer program product. For example, one having skill in the art will appreciate that the present invention can be embodied in multiple computer program products, multiple computer program products and hardware products, or combined in a single computer program product having the functionality of other computer program products described further herein. The computer programs or computer program product are stored on a memory 160, the memory being a tangible, non-transitory computer-readable storage medium, and operable on a processor 105. Computer programs or computer program product have a set of instructions stored therein, as can be shown with reference to FIG. 9, that when executed by the processor 105, perform certain operations. The set of instructions in the computer program product 162, for example, can include an instruction to detect 901 a communication failure between the integrated node and any of the subsystems, including detecting the time of the communication failure. Also, the computer program product can include an instruction for the integrated node to detect a corresponding communications recovery between the integrated node and the subsystem for which a communication failure was detected, including detecting the time of the communication recovery. Responsive to the detection of both the communication failure and the communications recovery, the computer program product 162 can instruct the integrated node 100 to retrieve 904 a data file or multiple data files from the subsystem for which a communication failure and communication recovery was detected. Responsive to retrieving the data file or files, the computer program product can provide one or more instructions to the integrated node to extract 905 time-stamped process data from the data file or files retrieved. The time-stamped process data can be extracted starting from the time of subsystem communication failure and ending at the time of the subsystems communication recovery. The data flow for the retrieval of process data can be shown with reference to the exemplary data flow 230 in FIG. 2B, which includes the network interface 103, input/output unit 104, protocol translator or translation server 102, and database server 101. Responsive to extracting the process data, the program product can provide one or more instructions to the integrated node to transmit 806 the extracted process data to the remote host, as can be further shown with reference to the exemplary data flow 240 in FIG. 2B, which includes the input output unit 104 and network interface 103 in communication with the remote host computer 110.

Figure 4A:
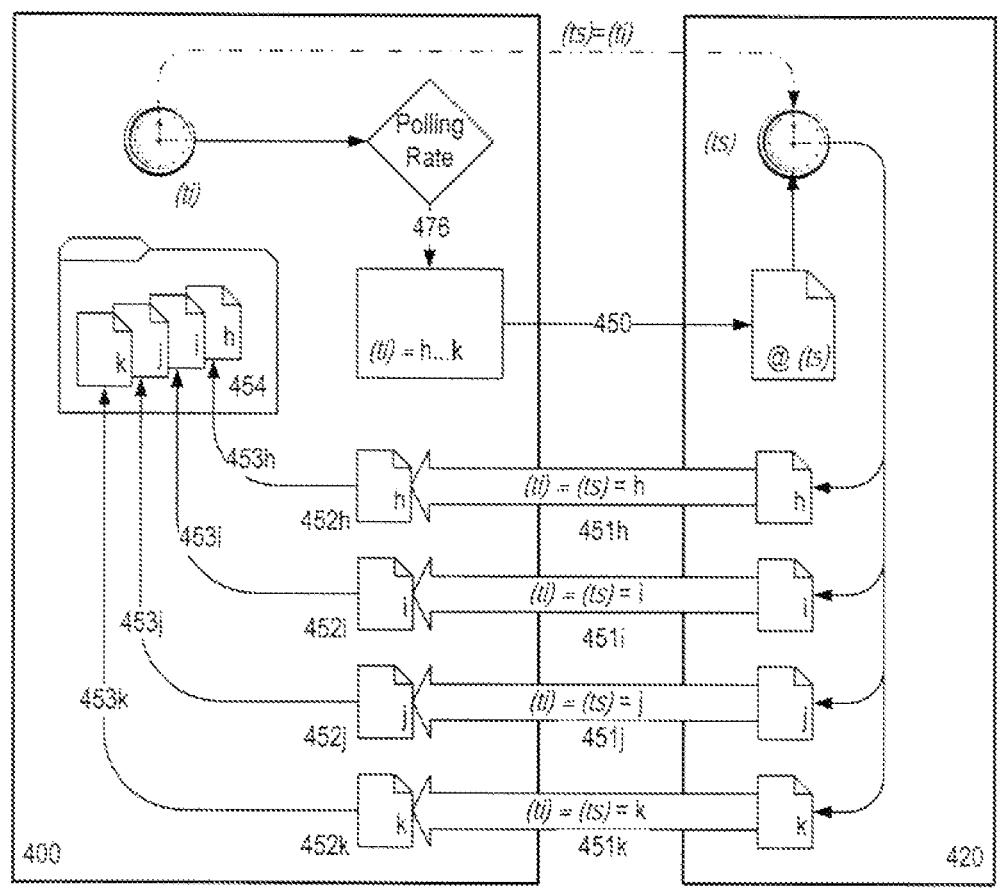
FIG. 4A is a schematic diagram of an integrated node showing the data acquisition operation performed by the integrated node for a particular span of time according to an embodiment of the present invention.

As can be shown with reference to FIG. 3 and FIG. 4A, embodiments of an integrated node can poll 450 a remote subsystem 420 at a pre-defined rate 476 to receive, at the same pre-defined rate, over communication links 451h, 451i, 451j, and 451k certain time-stamped industrial process data 452h, 452i, 452j, and 452k. Upon receiving the time-stamped industrial process data 452h, 452i, 452j, and 452k at times h, i, j, k, the data is archived 453h, 453i, 453j, and 453k in an archive file 454 corresponding to the date and time of the time-stamped industrial process data 452h, 452i, 452j, and 452k. The integrated node 400 can monitor the status of the communication links between the integrated node 400 and the plurality of remote subsystems 420. Failure of the communication link can be detected and reported 902, according to instructions therefore in the computer program product, to the remote host as a high priority alarm. In addition, those having skill in the art will appreciate that any failure may also be reported to other systems as a high-priority alarm, including, for example, other nodes, hosts, or subsystems. The computer program product can further include instructions to receive and handle 903 commands from the remote host to initiate the restoration as is described with respect to the instruction to retrieve 904, extract 905, and transmit 806.

Figure 4B:
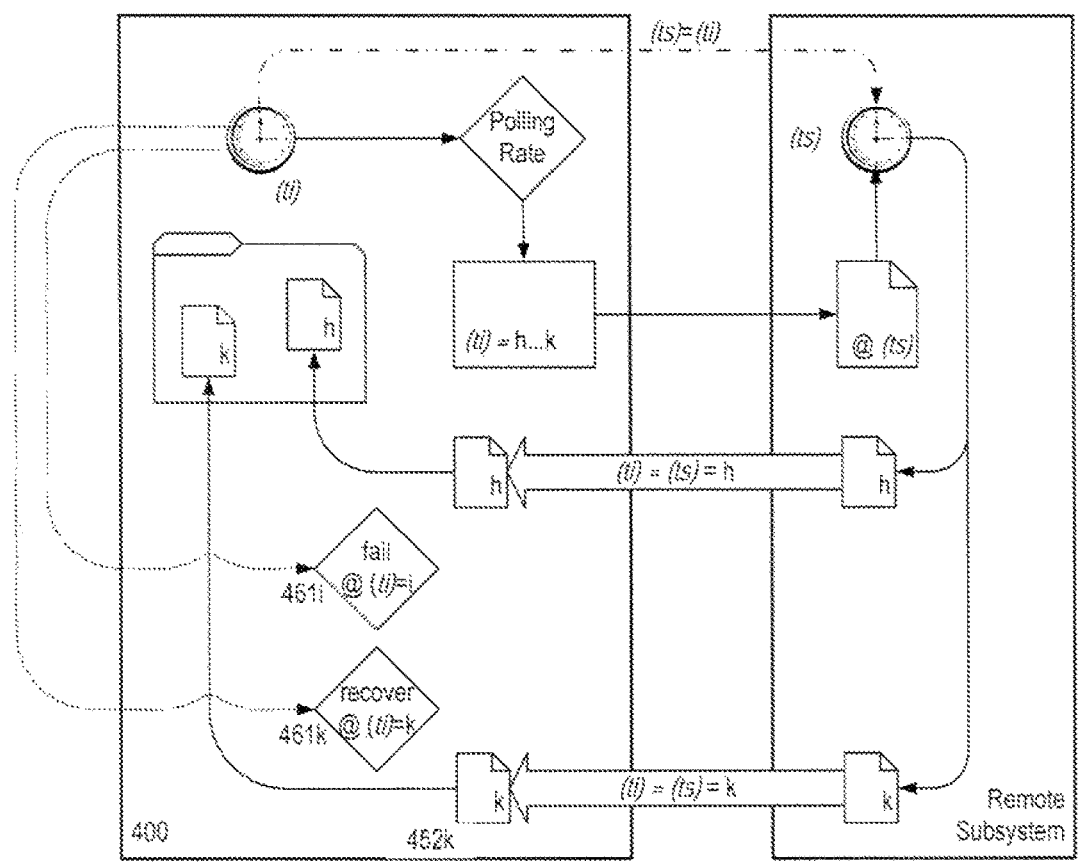
FIG. 4B is a schematic diagram of an integrated node showing the data acquisition operation in which a monitoring operation detects a communication failure and a communication recovery over a particular span of time according to an embodiment of the present invention.
Figure 4C:
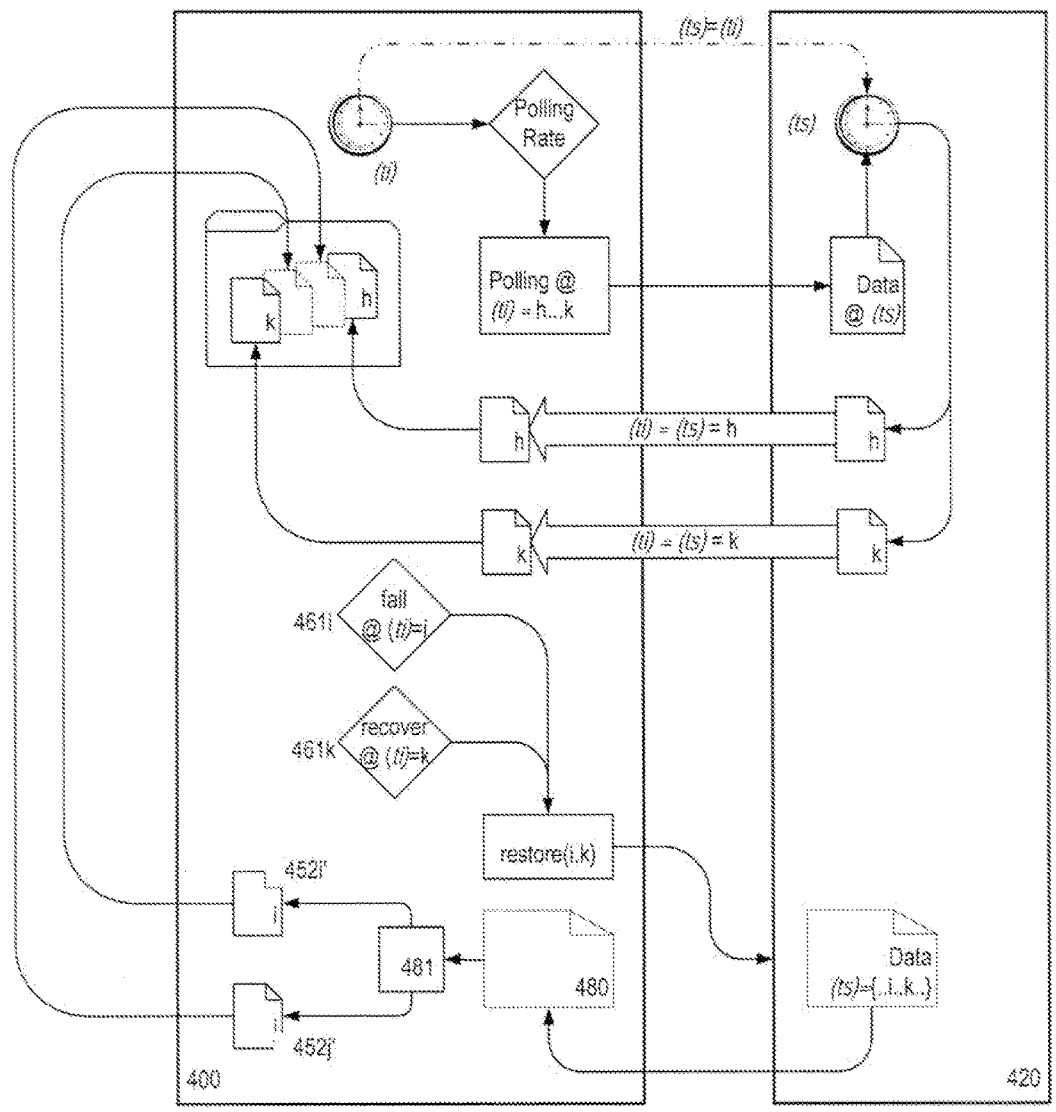
FIG. 4C is a schematic diagram of an integrated node showing the restoration operation from a remote subsystem responsive to the monitoring operation detecting a communication failure and a communication recovery over a particular period of time according to an embodiment of the present invention.

In further detail, can be as shown in FIG. 4B, when there is a communications failure 461i at $(t_t)=i$ and a communications recovery 461k at $(t_t)=k$ (with respect to the data acquiring operation in FIG. 4A) time-stamped process data 452i-452j, i.e., 452i-452(k−1) are not collected at the times $(t_t)=i$ and $(t_t)$ j, respectively. For an exemplary communications failure occurring in the communications between the integrated node 400 and any of the plurality of remote subsystems 420, the integrated node, in particular the subsystems restorer 162, can detect and log the time and date of when the communication failure occurred and when communications are restored. In further detail, when the communications recovery 461k is detected at $(t_t)=k$, time-stamped data file 452k can be received normally as can be shown with reference to FIG. 4A. As will be understood by those having skill in the art, the integrated node 400 can determine which file or file(s) containing daily data (24 hours of data) is to be accessed and retrieved from the remote subsystem 420. As can be shown with reference to FIG. 4C, the operation of retrieving at least one data file 480 from remote subsystem 420 can be performed responsive to detecting the time of failure 461i and the time of recovery 461k and the operation of extracting 481 can be performed responsive to the times of failure $(t_t)=i$ and recovery $(t_t)=k$, the time-stamped process data files 452i' and 452j' being extracted from the retrieved data file 480 (corresponding to the process data not collected in 452i and 452j as can be shown with reference to FIG. 4B). That is, the integrated node can extract process data and time-stamp data from the CSV file or any pre-defined file data format starting from communication failure time and date and ending at communications restored time and date.

Figure 4D:
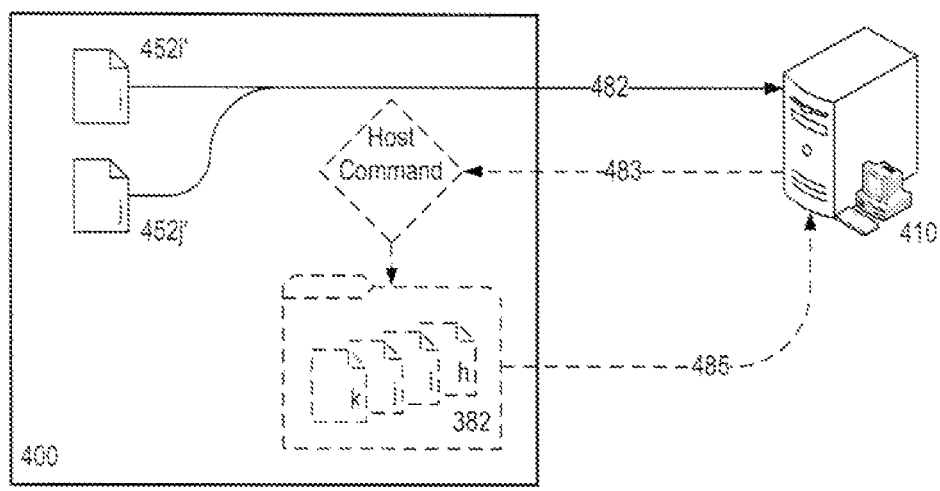
FIG. 4D is a schematic diagram of an integrated node showing transmission operation transmitting the data recovered by the data restoring operation to the remote host computer according to an embodiment of the present invention.

As can be shown with reference to FIG. 4D, methods for transmitting the extracted process data to the remote host can be performed responsive to the extracting operation 481. An exemplary embodiment of such a method can include, for example, performing a file transfer or a copy operation, such as through FTP, of the extracted process data 452i'-452j' to the remote host computer 410. The integrated node 400 can issue a command, such as an FTP copy command, to copy one or more data files responsive to the time and date of the communication failure and the time and date of the communications restoration. Where a plurality of subsystems 420 are connected to the same integrated node 400, each integrated node 400 can perform the same process with respect to each of the plurality of subsystems 420.

Another exemplary embodiment of such a method can include, for example, performing the file transfer or copy operation, such as through FTP, of a data file containing the extracted process data 452i' and 452j', such as a data file being provided in response to the time of failure $(t_t)=i$ and the time of recovery $(t_t)=k$. respectively, for the detected communications failure and communications recovery. One skilled in the art will appreciate that the data file, for example, the archive file 382 as can be shown with reference to FIG. 3, can be provided responsive to a command received from the remote host computer 410 to retrieve time-stamped process data, including, for example, data 452i' and 452j'. Upon an loss of data acquisition from the integrated node, for example, the remote host or the integrated node can detect the time at which communications were interrupted and time at which communications were restored. The remote host computer, furthermore, can retrieve recovered data, copying the recovered data into the remote host computer history, recreating one or more new CSV files pertaining to the missing data from the recovered file received from the node, and thereafter transferring the file(s) to an enterprise system, if necessary. Should the file transfer process fail, the file transmission process can be repeated until the file is copied successfully. Furthermore, upon detecting bandwidth starvation, the integrated node can store collected data and buffer affected data transmissions accordingly.

Various embodiments of an integrated node also include a computer program product 163 for monitoring and recovery of transmissions between the integrated node and the remote host. As one skilled in the art will appreciate, the present invention is not limited to embodiments using a single computer program or computer program product. For example, one having skill in the art will appreciate that the present invention can be embodied in multiple computer program products, multiple computer program products and hardware products, or combined in a single computer program product having the functionality of other computer program products described further herein. The computer programs or computer program product are stored on a memory 160, the memory being a tangible, non-transitory computer-readable storage medium, and operable on a processor 105. Computer programs or computer program product have a set of instructions stored therein, that when executed by the processor 105, perform certain operations. The set of instructions in the computer program product 163, which can be shown with reference to FIG. 10, for example, can include an instruction to detect 1001 a communication failure between the integrated node and the remote host, including detecting the time of the communication failure. Also, the computer program product can provide one or more instructions to the integrated node to detect 1001 a corresponding communications recovery between the integrated node and the remote host, including detecting the time of the communication recovery. After detecting the communication failure and the communications recovery, the computer program product can provide one or more instructions to the integrated node to report 1002 the time of the communication failure and the time of the communication recovery to the remote host so that the remote host can initiate a restoration of missing data. The computer program product can further provide one or more instructions to the integrated node to receive and handle 1003 commands from the remote host to initiate the restoration of missing data. The computer program product can even further provide one or more instructions to the integrated node to extract 1004 time-stamped process data from a time-stamped archive file responsive to the time of the communication failure and recovery and then to transmit 806 the extracted time-stamped process data to the remote host. The program product can further provide one or more instructions to the integrated node to monitor 807 the communications link between the integrated node and the remote host to detect bandwidth starvation in the data transmissions, and to buffer 808 the data transmissions responsive thereto. The data flow 250 for the foregoing exemplary embodiment can be shown with reference to FIG. 2C, which includes the network interface 103, input/output unit 104, and the database server 101.

Figure 5:
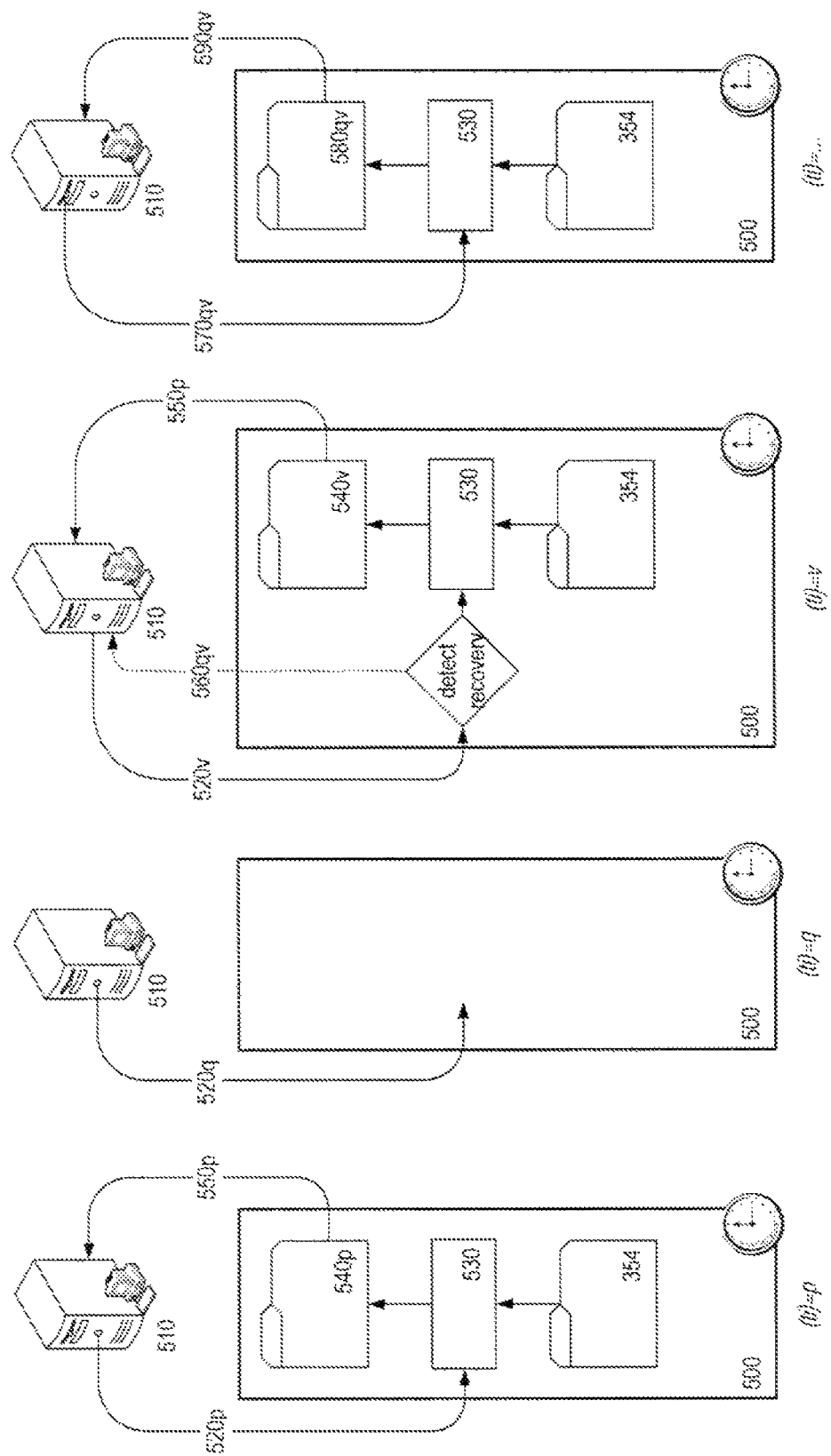
FIG. 5 is a schematic diagram of an integrated node showing the operation of data retrieval by a remote host computer in which the remote host computer or the integrated node detects a communication failure and a communication recovery over a particular period of time, including showing a transmission operation to transmit the data recovered to the remote host computer, according to an embodiment of the present invention.

In further detail, FIG. 5 illustrates the recovery of process data responsive to a communication failure and communication recovery in the communications link between the integrated node 500 and the remote host computer 510, particularly with respect to data retrieval by the remote host computer 310, which is described herein with respect to FIG. 3. The node 500 and remote host 510 are depicted, for exemplary purposes, over a span of time (represented going from left to right in the Figure) starting from time $(t_i)=p$, when the remote host 510 performs a normal successful retrieval of process data from the integrated node 500, which can be shown with reference to FIG. 3, wherein the remote host 310 retrieves a data file 382 at the rate 380'. Returning to FIG. 5, when time advances to time $(t_i)=q$ (whereas q-p is understood to be a period corresponding to the rate 390) the integrated node 500 can detect a failure in communications 520q between the integrated node 500 and the remote host computer 510. Alternatively, the remote host computer 510 can detect the communication failure 520q. With further reference to FIG. 5, when time advances to time $(t_i)=v$ (whereas v-q is understood to be an arbitrary period corresponding to the time between detecting the communication failure and detecting the communications recovery) the integrated node can detect the communication recovery in the communications link 520v and transmits the notice 560qv of the recovery to the remote host computer 510, including the time and date of the communications failure and communications recovery. Alternatively, the remote host computer 510 can detect the communications failure at time $(t_i)=q$ and the communications recovery at time (td=v, assuming that each of the remote host commuter 510 and the integrated node 500 are time-synchronized as is described herein with respect to FIG. 3. At time $(t_i)=v$, the integrated node can also extract time-stamped process data 540v from the archived data file 354, responsive to the request 520v from the remote host computer 510 and can transmit 550p the extracted time-stamped process data 540v to the remote host computer 510. Upon receiving notice 560qv from the integrated node 500, or upon detecting the communications failure and the communications recovery, the remote host computer 510 can issue command 570qv, to the integrated node 500, to restore data corresponding to the period (v-q) for the communications failure and the communications recovery. Upon receiving command 570qv, the integrated node 500 can responsively extract 530 the process data 580qv from a data file 354, the process data 580qv being responsive to the period (v-q) and the corresponding communications failure, and can further transmit 590qv the extracted process data 580qv to the remote host computer 510. If the transmission 590qv interferes with transmissions 550p or any transmission at time $(t_i)=n$, 550n, the remote host can buffer data transmissions 590qv and 550n to the remote host computer 510, accordingly, to thereby regulate communications traffic being transmitted to a remote host computer 510 responsive to collected data volume, communication link failure, and bandwidth limitation, as will be understood by those having skill in the art. Furthermore, the remote host computer 510 can initiate a copy of the file pertaining to the time of failure while continuously capturing real-time data.

Even further, as can be shown in FIG. 1A, various embodiments of the present invention can include at the integrated node 100, for example, a data validation and reconciler (DVRM) 164, which can be computer program or computer program product to perform validation and reconciliation of data collected from the plurality of remote subsystems 120. The DVRM 164 enhances the accuracy of data acquired by the integrated node 100, which also enhances the effectiveness of the integrated node 100 in controlling the plurality of remote subsystems 120. Those having skill in the art will appreciate that data validation functions and data reconciliation functions can be incorporated into one computer program product or module, such as the DVRM 164, or can be incorporated into one or more modules, such as a data validation module (DVM) 165 as can be shown in FIG. 6, a data reconciler (DRM) 166 as can be shown in FIG. 7, or any other related modules or sub-modules, such as a reporting module 167, for example. Exemplary embodiments are described herein with respect to a DVM 165, a DRM 166, and a reporting module 167, but those having skill in the art will appreciate that any described function of the DVM 165, DRM 166, or reporting module 167 can also be a function the DVRM 164, and such is within the scope of the disclosure.

Figure 2D:
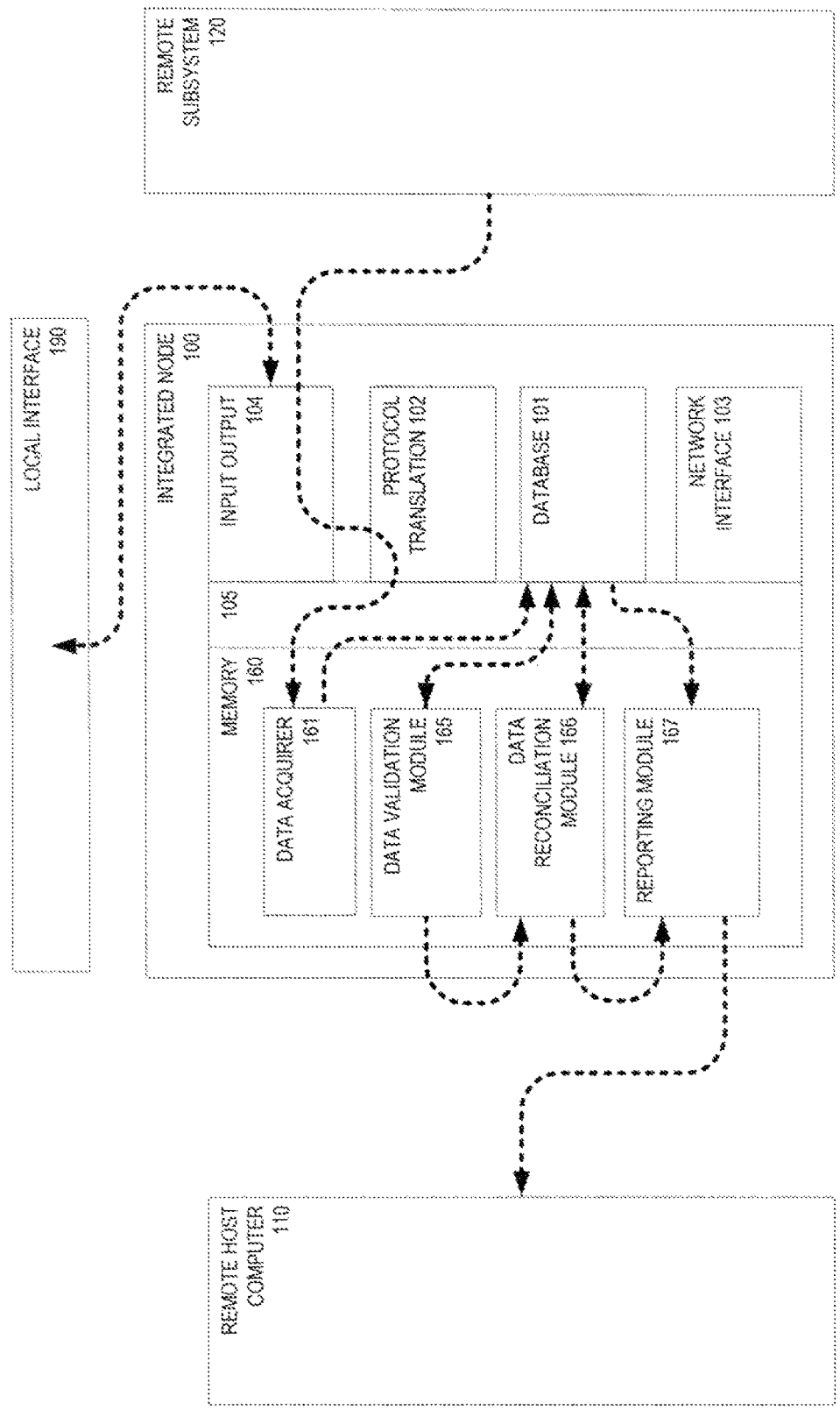
FIG. 2D is a schematic flow diagram of an integrated node performing the functions of a data validation module, data reconciler, and reporting module according to an embodiment of the present invention.
Figure 6:
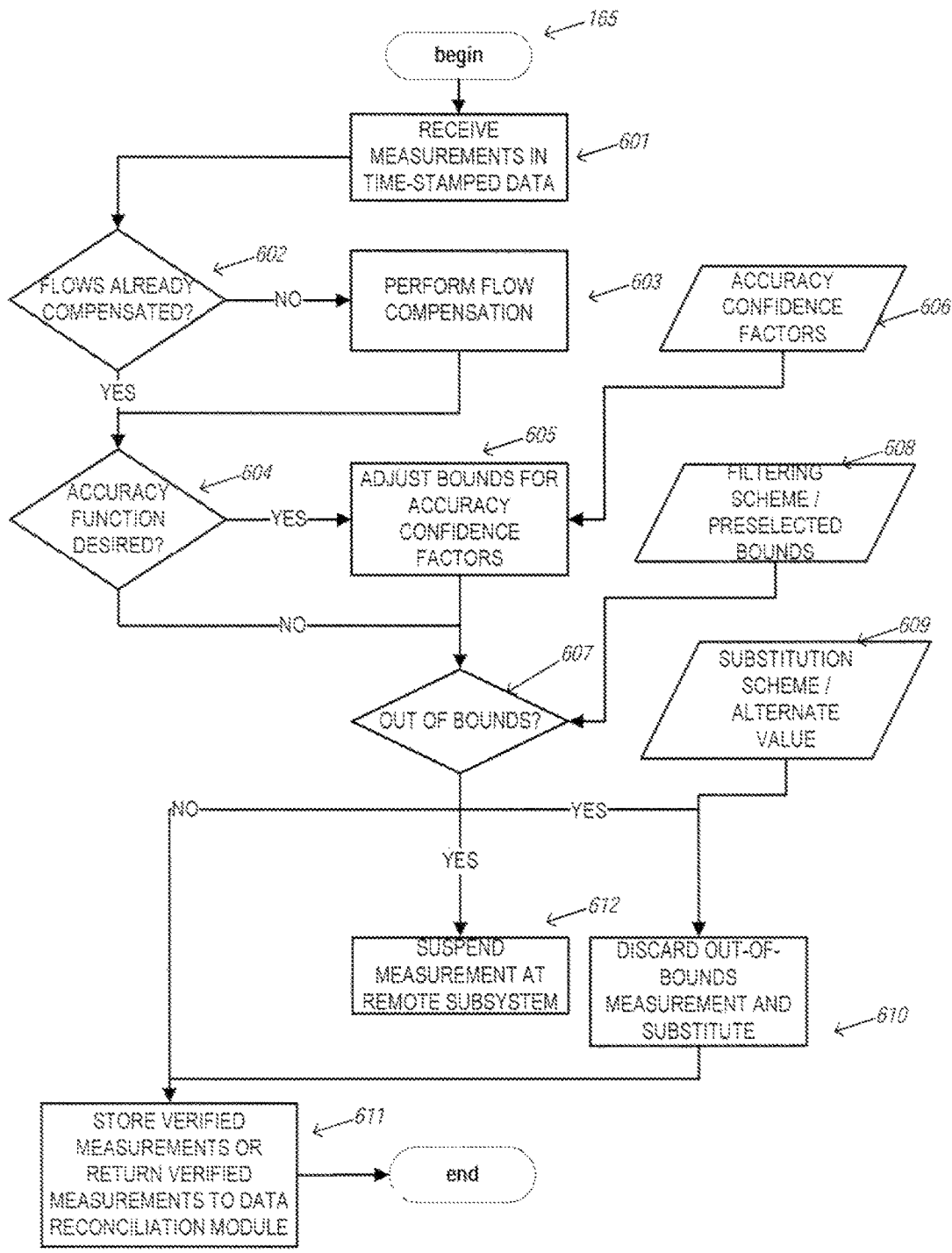
FIG. 6 is a flowchart illustrating an exemplary process flow for the data verifier according to an embodiment of the present invention.
Figure 7A:
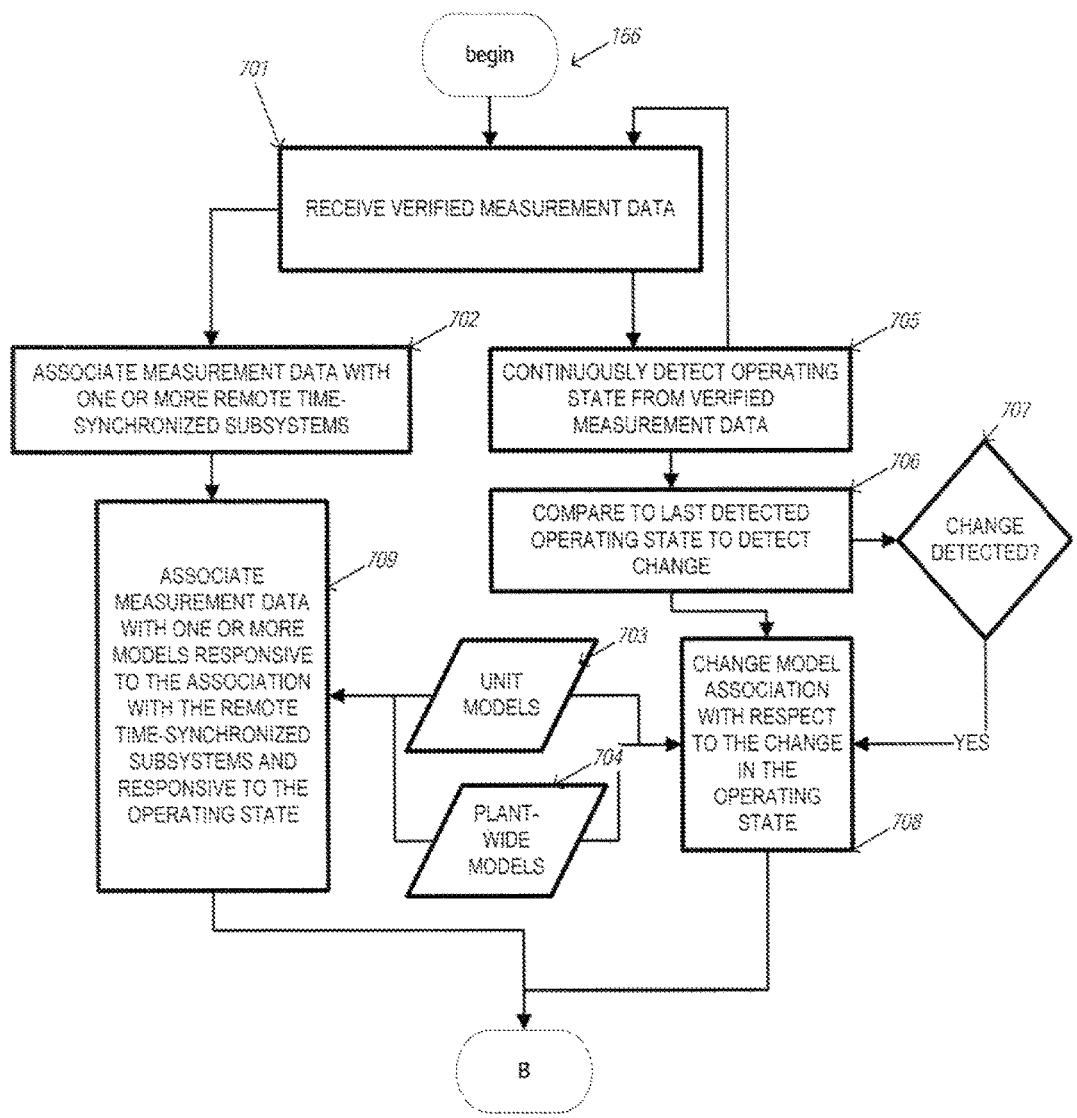
FIGS. 7A-7B is a flowchart illustrating an exemplary process flow for the data reconciler according to an embodiment of the present invention.
Figure 7B:
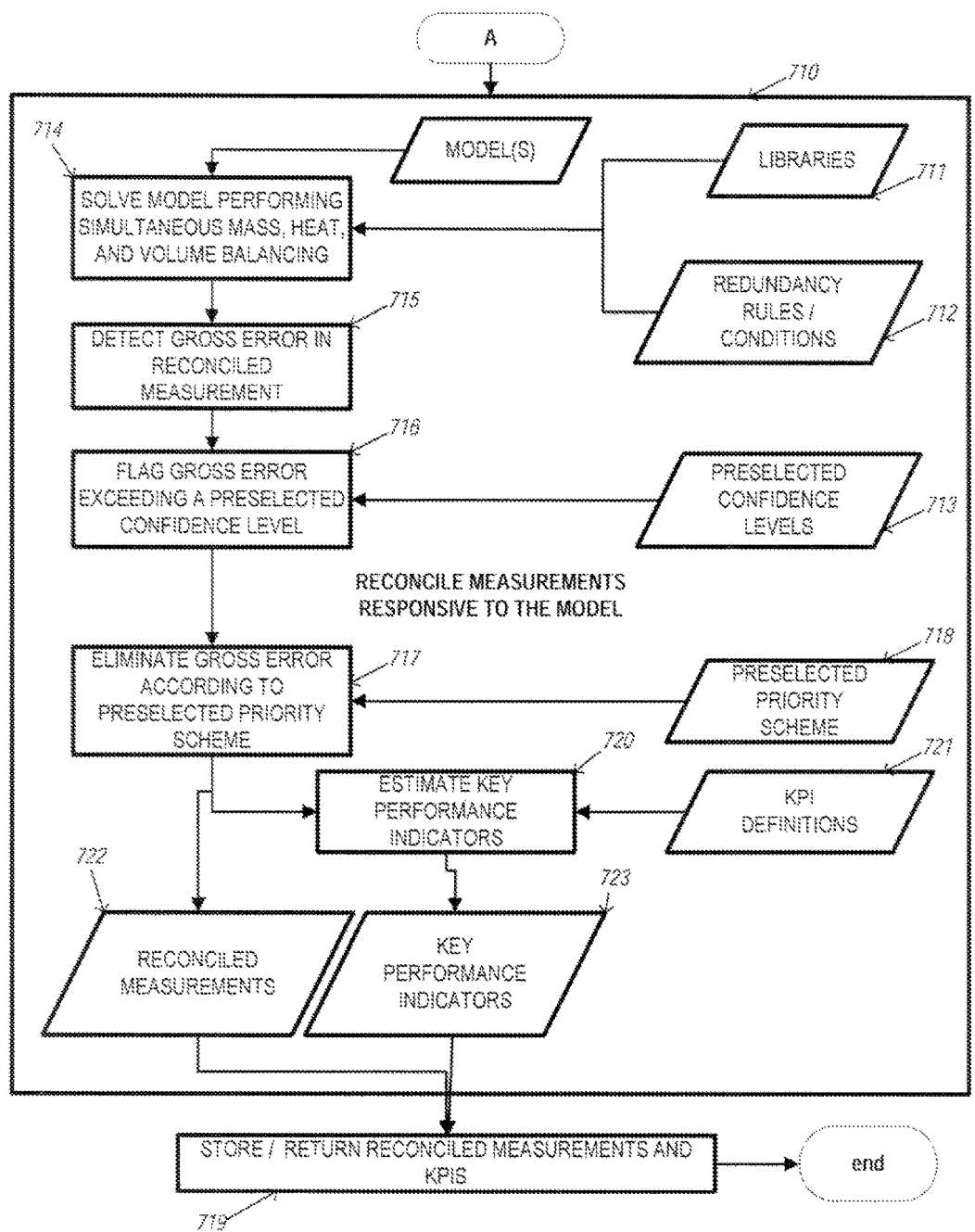

As can be shown with reference to FIG. 2D, FIG. 6, and FIG. 7, the DVM 165 can receive as input 601 the data acquired from any of the plurality of remote subsystems 120 to perform data validation functions as described further herein and, further, to output verified measurement data to the DRM 166 or to other components or modules, whether internal or external to the integrated node 100 (e.g., for storing data or outputting data to a remote host). Further, the DRM 166 can receive input 701 of the verified measurement data output from the DRM 166 or any measurement data collected from any of the plurality of remote subsystems 120 to perform data reconciliation functions as described further herein and to output measurement data to other components or modules, whether internal or external to the integrated node (e.g., data storage, data output to a remote host). As can be shown with reference to FIG. 2, the data input to the DVM 165, DRM 166, or DVRM 164 can be first acquired and converted using the data acquirer 161 and the protocol translator or translation server 102. Additionally, as an intermediate step, as can be shown with reference to FIG. 2D, any process data or measurement data can be stored at, or accessed from, the database server 101.

The DVM 165 can include or provide measurement bounding, which can be shown with reference to FIG. 6. In such embodiments, the DVM 165 can process raw measurement data using filtering procedures 607 being known to those having skill in the art to identify measurements that are outside of preselected bounds 608. For example, a computer program product 1100, as can be shown with reference to FIG. 11, can include one or more instructions to compare 1101 measurements in time-stamped data to pre-defined bounds to determine if a measurement is an out-of-bounds measurement. Data filtering procedures can, for example, remove and replace certain readings (e.g., unrealistic or incorrect readings) and measurements that are out of bounds, for example, according to instruction 1106, which thereby enhances downstream use of the filtered measurements in later calculations, i.e., enhancing convergence results in a reconciliation performed by the DRM 166. The preselected bounds 608 can be stored, for example, in memory 160 or at the database 101 and can include at least one level of bounds (an upper and a lower) for each measurement, as will be understood by those having skill in the art. Data filtering procedures can be implemented to detect values outside of the preselected bounds and, responsively, to replace the filtered value 610 with an alternate value 609. The alternate value can be, for example, a default value, a minimal or maximal value of a preselected interval of past measurements, a last good measurement (i.e., a validated and not filtered measurement), an average of the preselected bounds, an average of a preselected number of measurements or interval of past measurements, the upper bound, the lower bound, or any preselected absolute or relative value. Data filtering procedures can also, responsive to detecting measurement data outside of the preselected bounds, for example, command 612 the plurality of remote subsystems 120 or the data acquirer 161 to deactivate or suspend measurement or data acquisition functions, for example, according to instruction 1107.

The DVM 165 can also include or provide, for example, adaptive accuracy functionality 604. In such embodiments, the DVM 165 can adjust the data filtering bounds responsive to a predefined accuracy configuration for the measurements 605. The accuracy configuration can include user-configurable confidence factors 606 assigned to certain measurements that are likely to affect reconciliation, as is described further herein. Accuracy confidence factors can also be programmatically assigned responsive to certain different measurement types.

The DVM 165 can also include or provide, for example, flow compensation functionality, as will be understood by those having skill in the art. In such embodiments, the DVM 165 can determine whether flow readings are compensated 602 and perform the compensation 603, unless compensated flow measurements have been provided directly from the data source, i.e., one or more of the plurality of remote subsystems 120.

Figure 11:
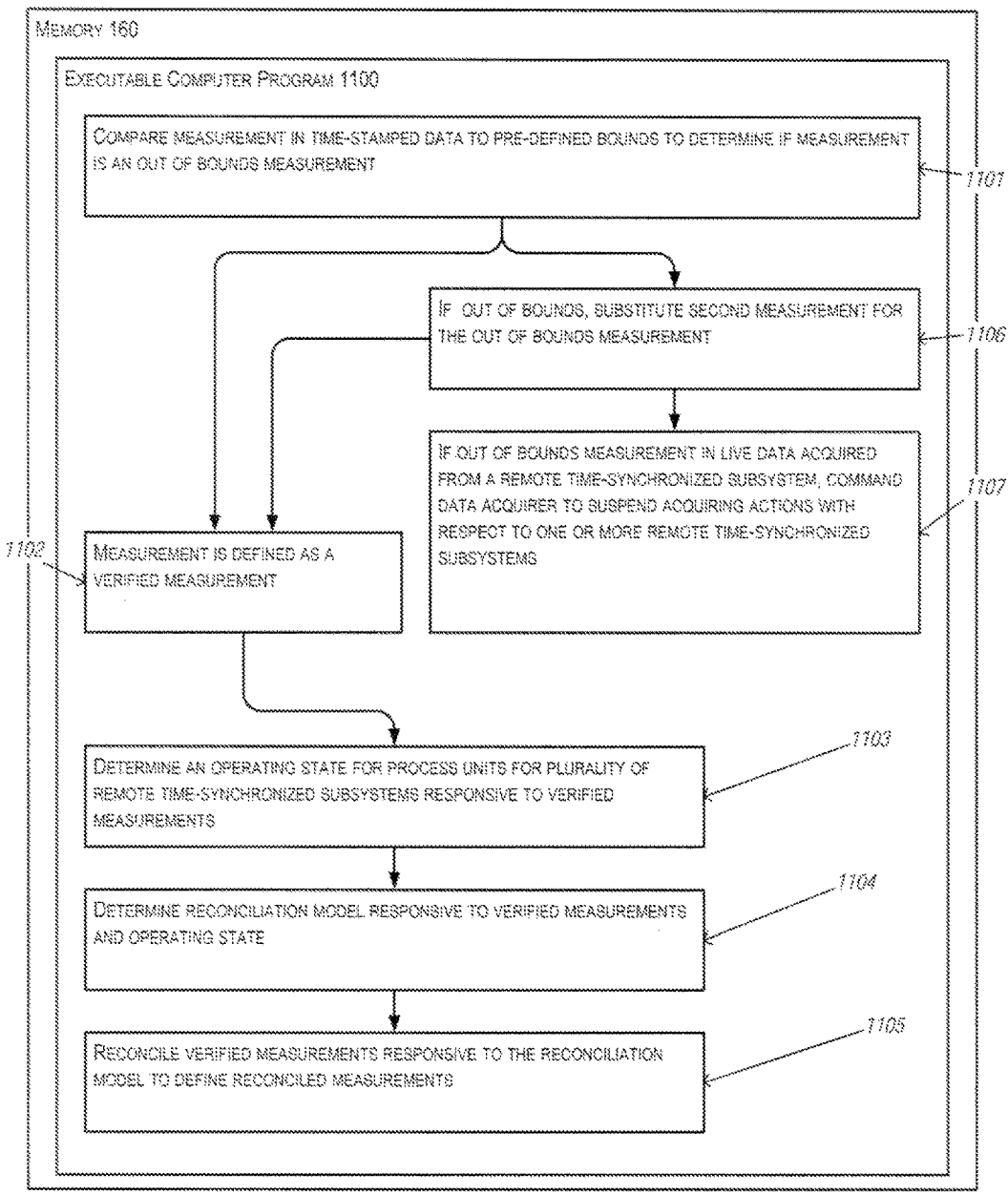

Turning to the data reconciler (DRM) 166, as can be shown in FIG. 2D and FIG. 7, the DRM 166 can receive as an input 701 the measurement data verified by the data validation module (DVM) 165, i.e., validated measurement data, which can be validated, for example, according to instruction 1102 as can be shown with reference to FIG. 11. In other words, the combination of data bounds and accuracy functionality "drive" the data reconciliation process and enhance the accuracy factors thereof, as is described further herein. Such functionality in DRM 166 can be provided for measurement data, such as measurement data for flow, pressure, temperature, and density that is normally distributed.

The DRM 166 can further include or provide pre-defined reconciliation models 703, 704. The pre-defined reconciliation models can be stored as will be known to those having skill in the art, for example, in the memory 160 or in the database 101. The pre-defined reconciliation models may be defined, for example, for a specific process or unit (a "unit model") or for the entire plant (a "plant-wide model"); and each pre-defined reconciliation model can include, for example, a different set of standard procedures or rules to be implemented for the reconciliation of measurement data for the unit or plant. A plant-wide model may be include or may depend on one or more unit models. Pre-defined reconciliation models can also be tailored to an operating state of the unit or plant 709. For example, computer program product 1100, as can be shown with reference to FIG. 11, can include one or more instructions to determine 1103 an operating state, responsive to the verified measurement data, for one or more process units having one or more remote time-synchronized subsystems. As is described further herein, the pre-defined reconciliation models can be user-configurable through a configuration interface accessible to a user, for example, through a user terminal having an input device and a display device. The computer program product 1100 can further include one or more instructions to determine 1104 an a reconciliation model responsive to the verified measurements and the operating state and to reconcile 1105 the verified measurements, as is described in further detail in the following paragraphs.

The DRM 166 can further include or provide, for example, a configuration interface, such as the local interface 190. The configuration interface 190 can, for example, include an object-oriented graphical user interface ("GUI") having a built-in library of objects required to develop unit models and plant-wide models. As will be understood in the art, the configuration interface 190 may be implemented on a user-terminal computer and be configurable or operable by any number of peripheral devices for interacting with a user, such as a monitor, a keyboard, a mouse, a stylus, a printer, a touch-screen, a joystick, or any other known peripheral device in communication with the user-terminal computer. Modeling objects included at the configuration interface include, for example, objects to identify routing and process streams between plants and different numbers and types of process units, such as tanks, crude switches, and other process units that will be known to those having skill in the art. The configuration interface can also, for example, allow a user to assign to a model various types of data, including reconciled readings, key performance indicators (KPIs), confidence/accuracy factors, and unreconciled data (real-time and historical).

The DRM 166 can also provide or include, for example, state detection logic. In such embodiments, state detection algorithms can be used to process measurement data to detect an operational state of a unit or plant 705. For example, the DRM 166 can responsively detect steady state operations, or changes thereto, of remote subsystems 120 generating input for the unit or plant being reconciled. In addition he DRM can change 708 an implemented reconciliation model to a different reconciliation model for a different operational state responsive to detecting an operational event which changes the operational state 706, 707.

In further detail, a unit model 703 can be defined for a unit of related processes, for example, if minimum redundancy is to be achieved. Each unit model can correspond, for example, to one or more of the plurality of remote subsystems 120 and can reflect the operation logic of the unit and define unit production-balancing calculations based on open and closed transactions and unit input/output with respect to other process units and their corresponding process streams. Units to be modeled can include, for example: crude distillation unit, utilities, H2, vacuum distillation unit, fluid catalytic cracking, hydrocracker, crude stabilization facility, gas treating unit, gas condensation unit, natural gas liquid, platformer, and viscosity breaker ("vis-breaker").

A plant-wide model 704, for example, can be configured for any group of units and can define a mass balancing loop for the plant based on crude switches, operation scenarios, and open and closed transactions (for example, when there is a change in the level status of tanks or the operation of pumps). The plant-wide model can, for example, reflect balancing calculations for inputs, outputs, and inventories of receipts, charges, processing, intermediate products, and final products. The plant-wide model can further reflect pre-defined allocation schemes to perform mass balancing based on the feed, charge, and products specifications. Further, the plant-wide model can reflect balancing calculations and methods for a user-initiated allocation of tanks, for example, when a service change occurs.

The DRM 166 can, for example, include predefined rules and conditions 712 to determine a minimum required redundancy level for a specific model to thereby enhance model convergence and confidence levels for the model. Such conditions can include, for example, switching a pump off if the flow is below certain limit or activating some bounds or streams based on some readings/conditions. In certain embodiments, a user can configure rules and conditions for redundancy using the configuration interface 190 as described herein. Accordingly, reconciliation of plant-wide models including such redundancies can overcome measurement inaccuracies or missing data.

The DRM 166 can further incorporate data libraries 711 as would be necessary to support reconciliation and other calculations in connection with the unit and plant-wide reconciliation models. The libraries, for example, can be stored according to techniques known to those having skill in the art, such as in the memory 160 or in the database 101. Libraries can include, without limitation, the following information:

a) Standard Volume Calculations: for methods according to the American Petroleum Institute's standard volume calculations, such as calculations to convert volumetric flow to mass flow and to convert mass flow to volumetric flow.
  b) Thermodynamics Libraries: for properties relating to pure compounds and pseudo-compounds for crude assays, such as true boiling points (TBP) for production and relevant thermodynamic properties for vapor-liquid equilibrium and methods representing other known processes in the oil refining and gas processing industry. Defined process data may include, for example, temperature, pressure, liquid or gas chromatography (an analysis performed in the laboratory), density, ASTM (American Standards for Testing Materials) D86, and TBPs.
  c) Mass and Heat Balance Optimization Calculations: for methods of combining mass, heat, and component balances with thermodynamic equilibrium information to form a single optimization problem. Major balances include, for example, the following: mass, volume, heat (energy), and component balancing. Thermodynamic equilibrium data, for example, can enhance redundancies (on separate and simultaneous runs) and increase the accuracy of reconciled measurements.
  d) Missing Composition Estimations: for calculating the average mass weight based on component mass balance and the thermodynamic libraries to increase the accuracy of estimating missing compositions.
  e) Missing Variable Estimation: for identifying and estimating values of unmeasured process variables and values of missing instruments (if existing redundancies allow).
  f) Pressure and Molecular Balance: for utilizing techniques of vapor-liquid equilibrium to calculate pressure and molecular balances.
  g) Chemical Reactions: for modeling reactions on the basis of atomic balances or user-defined equations.
  h) ASTM D86 (American Standards for Testing Materials): for converting ASTM D86 distillation curves to TBP curves for measurement validation in systems having multiple components.

The DRM 166 can further include or provide a model solver 714 to reconcile models and produce validated and reconciled data consistent with the foregoing functionality. The model solver can incorporate, for example, computer program product having instructions for solving reconciliation problems for the unit models and plant-wide models. Such embodiments can utilize algorithms known to those having skill in the art to solve rigorous reconciliation problems, for example, in less than ten minutes per run, such as sequential quadratic programming (SQP) algorithms (including Sequential Quadratic Programming with Interior Point). The model solver, for example, can perform simultaneous mass and heat balances, incorporate user-defined rules to handle measurement bounds, perform simultaneous mass and volumetric balance, support inequality constraints, and terminate if convergence is not achieved within a preselected number of iterations. In addition, the model solver can implement solver bounding according to preselected bounds for enhancing reconciled measurements. The solver bounds can, for example, function as described with respect to the DVM 165 measurement bounds.

The DRM 166 can further include or provide, for example, computer program product having instructions to detect gross errors in reconciled measurements 715. Various embodiments can determine a confidence level for reconciled values and a probability of gross error existence and, further, can flag 716 values that exceed a preselected confidence level 713. Preselected confidence levels 713 can be user-configurable; for example, a 95% confidence level can be a suitable default confidence level. In addition, the DRM 166 can utilize standard statistical methods to distribute random errors over measurements based on the confidence level. Also, DRM 166 can incorporate, for example, computer program product having instructions to eliminate gross errors in reconciled measurements. The computer program product having instructions for eliminating gross errors, for example, can provide the capability to remove measurements 717 with detected gross errors according to a preselected priority scheme 718, which includes: (i) giving the priority to remove measurements with larger magnitude of corrections; or (ii) giving the priority to remove measurements with highest impact on the total sum of reconciliation run penalty.

The DRM 166 can further output 719 the reconciled measurements 722 along with: an indication of the validated accuracy/precision of the reconciled measurement; an indication of major measurements that contribute to the validated accuracy; an identification of measurements improved by the reconciliation; and a quantification of the contribution of the reconciled measurements to the overall penalty of the reconciliation problem. As will be appreciated by those having skill in the art, the DRM 166 can output any of the measurements or values by storing to a storage medium such as memory 160 or database 101, by transmitting to remote host computer 110, or by transmitting to any other computer or interface in communication with the integrated node 100 over the input/output unit, such as the local interface 190 or any computer terminal having a graphical user interface as will be understood by those having skill in the art.

The DRM 166 can further include or provide, for example, computer program product having instructions 720 to estimate key performance indicators ("KPIs") 723 related to any of the following areas: loss identification, oil accounting, and performance monitoring. Other KPIs can include, for example: (i) loss management, i.e., for calculating an amount of losses incurred the unit or plant level; (ii) a reliability index based on the reconciled-to-theoretical yield ratio; (iii) performance-based KPIs, such as those indicating the fouling of heat exchangers; the efficiency of heaters, compressors, pumps, tubes, and fractionation; fractionation overlaps; and a performance index based on the ratio represented by equation [1]:

$$\frac{[1 - (\text{RECONCILED\_LOSSES})]}{[1 - (\text{UNRECONCILED\_LOSSES})]}. \quad [1]$$

As will be appreciated by those having skill in the art, the DRM 166 can retrieve data defining KPIs 721 from a storage medium such as memory 160 or database 101 in communication with to remote host computer 110 or in communication with any other interface in communication with the integrated node 100 over the input/output unit, such as the local interface 190 or any computer terminal having a graphical user interface, as will be understood by those having skill in the art. The DRM 166 further include or provide computer program product having instructions to calculate the error contributing to, or resulting from, each input measurement used to calculate KPIs. For example, the computer program product can have instructions to calculate statistical interactions between different measurements using covariance analysis, for example, by using covariance analysis to calculate interactions between KPIs or between KPIs and measurements. The computer program product can further have instructions to compute accuracies for each KPI responsive to reconciled measurements and calculated covariances.

The DRM 166 can further provide or include, for example, a reporting module 167, for example, a computer program product having instructions to deliver any of the reconciled measurements or determined values to another system or a user. As will be appreciated by those having skill in the art, the reporting module 167 can deliver measurements or values by storing such to a storage medium, such as the memory 160 or the database 101, by transmitting to remote host computer 110, or by transmitting to any other interface in communication with the integrated node 100 over the input/output unit, such as the local interface 190 or any computer terminal having a graphical user interface as will be understood by those having skill in the art. By way of example, and without limitation, measurements or values that can be delivered according include: quality of reconciled model based on assumptions, redundancies, and measurements; reconciled measurements and accuracies thereof; estimated measurements and the accuracies thereof; KPIs determined from reconciliation model and accuracies thereof; flagged and suspected out-of-bounds measurements and reconciliations; and any measurements or values selected or configured by a user, which can be selected according to a customized report. For example, reporting functionality may incorporate one or more proprietary or standard reporting tools, such as Crystal Reports® or Microsoft® Office Excel (add-in). Reports may be generated, for example, according to yield and loss accounting (i.e., charge/feed balancing); environmental compliance of drainage, tank vaporizations, and percentage of unaccountable or accountable losses; performance monitoring; and data/model analysis. Reports may be delivered in native or raw form and in any format known to those having skill in the art, including without limitation, formatted for Microsoft® Office Excel® or Microsoft® Office Word, or Adobe® PDF (portable document format). Reports may be sorted, for example, based on penalty, thereby allowing a user to readily identify where significant corrections have been applied. Reports may also flag certain measurements or values of particular interest, for example, using color coding, to indicate, for example, significant unaccountable losses, faulty or suspected readings, or reconciled measurements.

This application is a divisional of and claims priority and the benefit of U.S. application Ser. No. 13/188,899, which claims priority and the benefit of U.S. Provisional Patent Application No. 61/367,207 filed Jul. 23, 2010 titled "Machine, Computer Program Products, And Computer-Implemented Methods Providing An Integrated Node For Data Acquisition And Control," and is related to U.S. application Ser. No. 14/143,585, filed on Dec. 30, 2013, titled "Integrated Nodes, Computer Readable Media and Program Products, and Computer-Implemented Methods for Providing an Integrated Node For Data Acquisition and Recovery, and for Remote Subsystem Control," each incorporated herein by reference in its entirety.

In the drawings and the specification, there have been disclosed a typical preferred embodiment of the invention, and although specific terms are employed in the drawings, specification, the terms are used in a descriptive sense only and not for purposes of limitation. In addition, words related to numbering used in the drawings, specification, and the claims—such as "primary," "secondary," "first," "second," "third" or other ordinal numbers—are merely descriptive and do not define or connote an order, sequence, series, or degree of importance. Furthermore, to the extent that multiple embodiments or multiple features of a particular embodiment are described disjunctively in the drawings or the specification (such as a "computer program or a computer program product") are provided for exemplary purposes and to provide thoroughness in the disclosure and are not intended to imply any difference or an intent to differentiate among the meaning of the words used to describe the multiple embodiments or elements. Additionally, "computer readable medium" can both refer to a single medium or a combination of multiple computer readable media.

The invention has been described in considerable detail with specific reference to the illustrated embodiments; it will be apparent, however, that various modifications and changes can be made within the spirit and scope of the invention as described in the foregoing specification and as defined in the appended claims.

That claimed is:

1. A system comprising:
   a remote host;
   a plurality of remote time-synchronized subsystems; and
   an integrated node communicatively coupled to the remote host and the plurality of remote time-synchronized subsystems, the integrated node comprising a programmable logic controller comprising:
   one or more input-output units configured to transfer communications between the programmable logic controller, the plurality of remote time-synchronized subsystems, and the remote host;
   a database server configured to archive, in a plurality of time-stamped archive files, data acquired from the plurality of remote time-synchronized subsystems;
   a data acquirer configured to periodically acquire time-stamped data from each of the plurality of remote time-synchronized subsystems and to archive the time-stamped data, the time-stamped data comprising measurements; and
   a data verifier comprising program instructions stored on a non-transitory computer-readable storage medium, the program instructions being executable by a processor of the programmable logic controller, to cause the following operations:
   determine out-of-bounds measurements of the time-stamped data, each of the out-of-bounds measurements of the time-stamped data comprising a measurement of the time-stamped data having a value above an upper bound value or below a lower bound value;
   substitute new measurements for the out-of-bounds measurements of the time-stamped data to generate a plurality of verified measurements comprising the measurements of the time-stamped data comprising the new measurements substituted for the out-of-bounds measurements, wherein each of the new measurements substituted for an out-of-bound measurement comprises a minimal value of measurements of an interval of past measurements or a maximal value of the measurements of the interval of past measurements, wherein the one or more input-output units is configured to send the plurality of verified measurements to the remote host; and
   commanding, in response to determining the out-of-bounds measurements of the time-stamped data, the data acquirer to suspend acquiring time-stamped data from one or more of the plurality of remote time-synchronized subsystems.

2. A programmable logic controller as defined in claim 1, wherein determine the out-of-bounds measurements of the time-stamped data comprises determining a first out-of-bounds measurement of the time-stamped data, the first out-of-bounds measurement comprising a first measurement in the time-stamped data acquired from the plurality of remote time-synchronized subsystems; and
   wherein substitute the new measurements for the out-of-bounds measurements of the time- stamped data comprises substituting a second measurement for the first out-of-bounds measurement of the time-stamped data, and wherein the second measurement comprises the minimal value of the measurements of the interval of past measurements or the maximal value of the measurements of the interval of past measurements so that the plurality of verified measurements comprise the substituted second measurement.

3. A programmable logic controller as defined in claim 2, wherein substituting the second measurement for the first out-of-bounds measurement of the time-stamped data comprises discarding the first out-of-bounds measurement.

4. A programmable logic controller as defined in claim 1, wherein the operations further comprise:
   determining whether flow measurements in the time-stamped data are compensated for; and
   performing, in response to determining that the flow measurements in the time-stamped data are not compensated for, compensation of the flow measurements in the time-stamped data.

5. A programmable logic controller as defined in claim 1, wherein the operations further comprise:
   adjusting one or more data filtering bounds according to a predefined accuracy configuration including confidence factors assigned to one or more measurements of the time-stamped data.

6. A programmable logic controller as defined in claim 1, further comprising:
   a data reconciler comprising a program instructions stored on the non-transitory computer-readable storage medium, the program instructions being executable by the processor of the programmable logic controller, to cause the following operations:
   determine an operating state of the plurality of remote time-synchronized subsystems; and reconcile the plurality of verified measurements based on the operating state of the plurality of remote time-synchronized subsystems.

7. A programmable logic controller as defined in claim 6, wherein the operations caused by the execution of the program instructions of the data reconciler further comprise:
   determining an operating state of one or more process units of the plurality of the remote time-synchronized subsystems based on the plurality of verified measurements from the plurality of remote-time synchronized subsystems;
   determining a reconciliation model based on the plurality of verified measurements, the reconciliation model corresponding to the one or more process units and the operating state determined for the one or more process units; and
   reconciling the plurality of verified measurements based on the reconciliation model, the reconciling based on the reconciliation model employing a sequential quadratic programming algorithm to determine a plurality of reconciled measurements.

8. A programmable logic controller as defined in claim 6, wherein the operations caused by the execution of the program instructions of the data reconciler further comprise:
   detecting a change in the operating state of the one or more process units responsive to the plurality of verified measurements; and
   determining a new reconciliation model for the one or more process units responsive to the change in the operating state detected, wherein the reconciliation operation proceeds based on the new reconciliation model.

9. A programmable logic controller as defined in claim 6, wherein the operations caused by the execution of the program instructions of the data reconciler further comprise:
   detecting errors in reconciled measurements;
   determining a probability of error existence in values of the reconciled measurements;
   flagging the reconciled measurements having a probability of error that exceed a preselected confidence level; and
   removing the reconciled measurements with detected errors according to a preselected priority scheme comprising one of the following: providing priority to remove the reconciled measurements with a magnitude of corrections above a given magnitude, or providing the priority to remove the reconciled measurements with an impact on a total sum of reconciliation run penalty above a given impact.

10. Non-transitory computer-readable storage medium comprising program instructions stored thereon, the program instructions being executable by a processor to cause the following operations:
    transferring communications between an integrated node, a plurality of remote time synchronized subsystems, and a remote host;
    acquiring, by the integrated node and from each of the plurality of remote time-synchronized subsystems, time-stamped data comprising measurements;
    determining, by the integrated node, out-of-bounds measurements of the time-stamped data, each of the out-of-bounds measurements of the time-stamped data comprising a measurement of the time-stamped data having a value above an upper bound value or below a lower bound value;
    substituting, by the integrated node, new measurements for the out-of-bounds measurements of the time-stamped data to generate a plurality of verified measurements comprising the measurements of the time-stamped data comprising the new measurements substituted for the out-of-bounds measurements, wherein each of the new measurements substituted for an out-of-bound measurement comprises a minimal value of measurements of an interval of past measurements or a maximal value of the measurements of the interval of past measurements;
    sending, by the integrated node, the plurality of verified measurements to the remote host; and
    suspending, in response to determining the out-of-bounds measurements of the time-stamped data, the acquiring of time-stamped data from one or more of the plurality of remote time-synchronized subsystems.

11. Non-transitory computer readable medium as defined in claim 10, wherein determining the out-of-bounds measurements of the time-stamped data comprises
    determining a first out-of-bounds measurement of the time-stamped data, the first out-of-bounds measurement comprising a first measurement in the time-stamped data acquired from each of the plurality of remote time-synchronized subsystems; and
    wherein substituting the new measurements for the out-of-bounds measurements of the time-stamped data comprises substituting a second measurement for the first out-of-bounds measurement of the time-stamped data, and
    wherein the second measurement comprises the minimal value of the measurements of the interval of past measurements or the maximal value of the measurements of the interval of past measurements so that the plurality of verified measurements comprise the substituted second measurement.

12. Non-transitory computer readable medium as defined in claim 10, wherein the operations further comprise:
    determining whether flow measurements in the time-stamped data are compensated for; and
    performing, in response to determining that the flow measurements in the time-stamped data are not compensated for, compensation of the flow measurements in the time-stamped data.

13. Non-transitory computer readable medium as defined in claim 10, wherein the operations further comprise:
    determining an operating state of the plurality of remote time-synchronized subsystems; and
    reconciling the plurality of verified measurements based on the operating state of the plurality of remote time-synchronized subsystems determined.

14. Non-transitory computer readable medium as defined in claim 10, wherein the operations further comprise
    determining an operating state of one or more process units of the plurality of the remote time-synchronized subsystems based on the plurality of verified measurements from the plurality of remote-time synchronized subsystems,
    determining a reconciliation model based on the plurality of verified measurements, the reconciliation model corresponding to the one or more process units and the operating state determined for the one or more process units, and
    reconciling the plurality of verified measurements based on the reconciliation model, the reconciling based on the reconciliation model employing a sequential quadratic programming algorithm to determine a plurality of reconciled measurements.

15. Non-transitory computer readable medium as defined in claim 13, wherein the operations further comprise:
    detecting errors in reconciled measurements;
    determining a probability of error existence in values of the reconciled measurements;
    flagging the reconciled measurements having a probability of error that exceed a preselected confidence level; and
    removing the reconciled measurements with detected errors according to a preselected priority scheme comprising one of the following: providing priority to remove the reconciled measurements with a magnitude of corrections above a given magnitude, or providing the priority to remove the reconciled measurements with an impact on a total sum of reconciliation run penalty above a given impact.

16. A method comprising the steps of:
    transferring communications between an integrated node, a plurality of remote time synchronized subsystems, and a remote host;
    acquiring, by the integrated node and from each of the plurality of remote time-synchronized subsystems, time-stamped data comprising measurements;
    determining, by the integrated node, out-of-bounds measurements of the time-stamped data, each of the out-of-bounds measurements of the time-stamped data comprising a measurement of the time-stamped data having a value above an upper bound value or below a lower bound value;
    substituting, by the integrated node, new measurements for the out-of-bounds measurements of the time-stamped data to generate a plurality of verified measurements comprising the measurements of the time-stamped data comprising the new measurements substituted for the out-of-bounds measurements, wherein each of the new measurements substituted for an out-of-bound measurement comprises a minimal value of measurements of an interval of past measurements or a maximal value of the measurements of the interval of past measurements;
    sending, by the integrated node, the plurality of verified measurements to the remote host; and
    suspending, in response to determining the out-of-bounds measurements of the time-stamped data, the acquiring of time-stamped data from one or more of the plurality of remote time-synchronized subsystems.

17. A method as defined in claim 16,
    wherein determining the out-of-bounds measurements of the time-stamped data comprises determining a first out-of-bounds measurement of the time-stamped data, the first out-of-bounds measurement comprising a first measurement in the time-stamped data acquired from the plurality of remote time-synchronized subsystems; and
    wherein substituting the new measurements for the out-of-bounds measurements of the time-stamped data comprises substituting a second measurement for the first out-of-bounds measurement of the time-stamped data, and wherein the second measurement comprises the minimal value of the measurements of the interval of past measurements or the maximal value of the measurements of the interval of past measurements so that the plurality of verified measurements comprise the substituted second measurement.

18. A method as defined in claim 16, further comprising the steps of:
    determining whether flow measurements in the time-stamped data are compensated for; and
    performing, in response to determining that the flow measurements in the time-stamped data are not compensated for, compensation of the flow measurements in the time-stamped data.

19. A method as defined in claim 16, further comprising the steps of:
    determining an operating state of the plurality of remote time-synchronized subsystems; and
    reconciling the plurality of verified measurements based on the operating state of the plurality of remote time-synchronized subsystems determined.

20. A method as defined in claim 19, further comprising the steps of:
    determining an operating state of one or more process units of the plurality of the remote time-synchronized subsystems based on the plurality of verified measurements from the plurality of remote-time synchronized subsystems,
    determining a reconciliation model based on the plurality of verified measurements, the reconciliation model corresponding to the one or more process units and the operating state determined for the one or more process units, and
    reconciling the plurality of verified measurements based on the reconciliation model, the reconciling based on the reconciliation model employing a sequential quadratic programming algorithm to determine a plurality of reconciled measurements.

21. A method as defined in claim 19, further comprising the steps of:
    detecting errors in reconciled measurements;
    determining a probability of error existence in values of the reconciled measurements;
    flagging the reconciled measurements having a probability of error that exceed a preselected confidence level; and
    removing the reconciled measurements with detected errors according to a preselected priority scheme comprising one of the following: providing priority to remove the reconciled measurements with a magnitude of corrections above a given magnitude, or providing the priority to remove the reconciled measurements with an impact on a total sum of reconciliation run penalty above a given impact.

* * * * *